United States Patent
Sugiyama et al.

(10) Patent No.: US 9,652,488 B2
(45) Date of Patent: May 16, 2017

(54) COMPUTER PRODUCT, VERIFICATION SUPPORT METHOD, AND VERIFICATION SUPPORT APPARATUS

(71) Applicant: FUJITSU LIMITED, Kawasaki-shi (JP)

(72) Inventors: Taichi Sugiyama, Kawasaki (JP); Takeshi Yasuie, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 508 days.

(21) Appl. No.: 13/845,590

(22) Filed: Mar. 18, 2013

(65) Prior Publication Data
US 2013/0246359 A1    Sep. 19, 2013

(30) Foreign Application Priority Data

Mar. 19, 2012 (JP) .................................. 2012-062777

(51) Int. Cl.
*G06F 17/30* (2006.01)
(52) U.S. Cl.
CPC .............................. *G06F 17/30371* (2013.01)
(58) Field of Classification Search
CPC ................................................ G06F 17/30371
USPC .......... 707/639, 687, 690; 370/229, 23, 241, 370/242, 244
See application file for complete search history.

(56) References Cited

U.S. PATENT DOCUMENTS

| | | | |
|---|---|---|---|
| 7,626,937 B2 * | 12/2009 | Chen .......................... | H04L 1/00 370/236 |
| 2001/0009547 A1 * | 7/2001 | Jinzaki et al. ................ | 370/390 |
| 2002/0120760 A1 * | 8/2002 | Kimchi ................... | H04L 29/06 709/230 |
| 2006/0187942 A1 * | 8/2006 | Mizutani ............. | H04L 12/5695 370/401 |
| 2007/0211718 A1 * | 9/2007 | Kang et al. .................... | 370/389 |
| 2008/0065616 A1 * | 3/2008 | Brown ................... | G06Q 10/06 |
| 2009/0290500 A1 * | 11/2009 | Nishi ...................... | H04L 43/50 370/246 |
| 2011/0228684 A1 | 9/2011 | Sugiyama et al. | |

FOREIGN PATENT DOCUMENTS

| | | |
|---|---|---|
| JP | 11-110253 | 4/1999 |
| JP | 2010-081194 | 4/2010 |
| JP | 2011-199680 | 10/2011 |

* cited by examiner

*Primary Examiner* — Hares Jami
(74) *Attorney, Agent, or Firm* — Fujitsu Patent Center

(57) ABSTRACT

A computer-readable recording medium stores a program that causes a computer to execute a verification support process that includes acquiring a series of data transmitted and received between apparatuses; creating a plurality of data groups by dividing the series of acquired data; detecting among the created data groups, a data group that includes given data acting as an issuance request for identification information of a transmission source; adding the given data to the beginning of subsequent data groups that are among the created data groups and transmitted after the detected data group; and outputting the subsequent data groups to which the given data has been added.

5 Claims, 20 Drawing Sheets

| | | | | | | |
|---|---|---|---|---|---|---|
| | | | CAPTURE DATA | ⌒ 400 | | |

| PACKET ID | Time | Src | Dst | Dst_Port | Session-ID | Info |
|---|---|---|---|---|---|---|
| p1 | 8:09:00 | CL | SV | 80 (HTTP) | | LOG-IN (USER NAME:Taro) |
| p2 | 8:09:03 | SV | CL | 10001 | | HTTP /1.0 200 OK (Set-Cookie:Alpha) |
| p3 | 8:09:10 | CL | SV | 80 (HTTP) | Alpha | REQUEST A |
| p4 | 8:59:12 | SV | CL | 10001 | Alpha | RESPONSE A (HTTP /1.0 200 OK) |
| p5 | 8:59:23 | CL | SV | 80 (HTTP) | Alpha | REQUEST B |
| p6 | 8:59:25 | SV | CL | 10002 | Alpha | RESPONSE B (HTTP /1.0 200 OK) |
| p7 | 8:59:30 | CL | SV | 80 (HTTP) | Alpha | REQUEST C |
| p8 | 8:59:31 | SV | CL | 10002 | Alpha | RESPONSE C (HTTP /1.0 200 OK (Set-Cookie:Bravo) ) |
| p9 | 8:59:50 | CL | SV | 80 (HTTP) | Bravo | REQUEST D |
| p10 | 9:00:01 | SV | CL | 10002 | Bravo | RESPONSE D (HTTP /1.0 200 OK) |
| p11 | 9:00:04 | CL | SV | 80 (HTTP) | Bravo | REQUEST E |
| p12 | 9:00:05 | SV | CL | 10002 | Bravo | RESPONSE E (HTTP /1.0 200 OK) |
| p13 | 9:00:10 | CL | SV | 80 (HTTP) | Bravo | REQUEST F |
| p14 | 9:00:25 | SV | CL | 10002 | Bravo | RESPONSE F (HTTP /1.0 200 OK (Set-Cookie:Charlie) ) |
| p15 | 9:00:30 | CL | SV | 80 (HTTP) | Charlie | REQUEST G |
| p16 | 9:00:31 | SV | CL | 10003 | Charlie | RESPONSE G (HTTP /1.0 200 OK) |
| p17 | 9:00:40 | CL | SV | 80 (HTTP) | Charlie | LOG-OUT |
| p18 | 9:00:41 | SV | CL | 10003 | Charlie | HTTP /1.0 200 OK(USER NAME:Taro) |
| ⋮ | ⋮ | ⋮ | ⋮ | ⋮ | ⋮ | ⋮ |

FIG.4

CAPTURE DATA 400

| PACKET ID | Time | Src | Dst | Dst_Port | Session-ID | Info |
|---|---|---|---|---|---|---|
| p1 | 8:09:00 | CL | SV | 80 (HTTP) | | LOG-IN (USER NAME:Taro) |
| p2 | 8:09:03 | SV | CL | 10001 | | HTTP /1.0 200 OK (Set-Cookie:Alpha) |
| p3 | 8:09:10 | CL | SV | 80 (HTTP) | Alpha | REQUEST A |
| p4 | 8:59:12 | SV | CL | 10001 | Alpha | RESPONSE A (HTTP /1.0 200 OK) |
| p5 | 8:59:23 | CL | SV | 80 (HTTP) | Alpha | REQUEST B |
| p6 | 8:59:25 | SV | CL | 10002 | Alpha | RESPONSE B (HTTP /1.0 200 OK) |
| p7 | 8:59:30 | CL | SV | 80 (HTTP) | Alpha | REQUEST C |
| p8 | 8:59:31 | SV | CL | 10002 | Alpha | RESPONSE C (HTTP /1.0 200 OK (Set-Cookie:Bravo)) |
| p9 | 8:59:50 | CL | SV | 80 (HTTP) | Bravo | REQUEST D |
| p10 | 9:00:01 | SV | CL | 10002 | Bravo | RESPONSE D (HTTP /1.0 200 OK) |
| p11 | 9:00:04 | CL | SV | 80 (HTTP) | Bravo | REQUEST E |
| p12 | 9:00:05 | SV | CL | 10002 | Bravo | RESPONSE E (HTTP /1.0 200 OK) |
| p13 | 9:00:10 | CL | SV | 80 (HTTP) | Bravo | REQUEST F |
| p14 | 9:00:25 | SV | CL | 10002 | Bravo | RESPONSE F (HTTP /1.0 200 OK (Set-Cookie:Charlie)) |
| p15 | 9:00:30 | CL | SV | 80 (HTTP) | Charlie | REQUEST G |
| p16 | 9:00:31 | SV | CL | 10003 | Charlie | RESPONSE G (HTTP /1.0 200 OK) |
| p17 | 9:00:40 | CL | SV | 80 (HTTP) | Charlie | LOG-OUT |
| p18 | 9:00:41 | SV | CL | 10003 | Charlie | HTTP /1.0 200 OK(USER NAME:Taro) |
| ... | ... | ... | ... | ... | ... | ... |

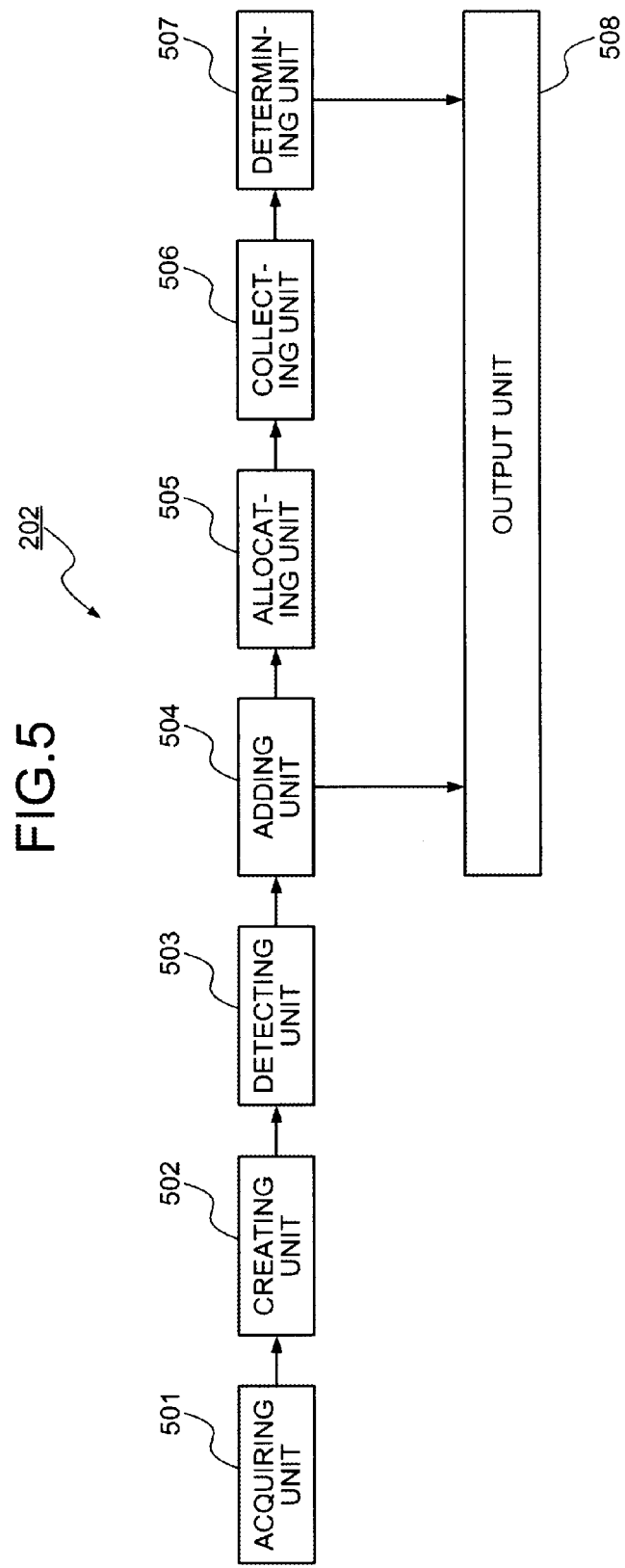

FIG.6

CAPTURE DATA 600

| PACKET ID | Time | Src | Dst | Dst_Port | Session-ID | Info |
|---|---|---|---|---|---|---|
| ... | ... | ... | ... | ... | ... | ... |
| p100 | 8:00:00 | 10.10.10.10 | 20.20.20.20 | 80 (HTTP) | ... | ... |
| p101 | 8:00:01 | 10.10.10.20 | 20.20.20.20 | 80 (HTTP) | ... | ... |
| p102 | 8:00:03 | 20.20.20.20 | 10.10.10.10 | 10000 | ... | ... |
| ... | ... | ... | ... | ... | ... | ... |
| p199 | 8:59:59 | 20.20.20.20 | 10.10.10.10 | 10005 | ... | ... |
| p200 | 9:00:00 | 20.20.20.20 | 10.10.10.10 | 10005 | ... | ... |
| p201 | 9:00:01 | 20.20.20.20 | 10.10.10.10 | 10005 | ... | ... |
| ... | ... | ... | ... | ... | ... | ... |

P₁: FROM 8:00:00 TO 8:59:59

| PACKET ID | Time | Src | Dst | Dst Port | Session-ID | Info |
|---|---|---|---|---|---|---|
| p1 | 8:09:00 | CL | SV | 80 (HTTP) | | LOG-IN (USER NAME:Taro) |
| p2 | 8:09:03 | SV | CL | 10001 | | HTTP /1.0 200 OK (Set-Cookie:Alpha) |
| p3 | 8:09:10 | CL | SV | 80 (HTTP) | Alpha | REQUEST A |
| p4 | 8:59:12 | SV | CL | 10001 | Alpha | RESPONSE A (HTTP /1.0 200 OK) |
| p5 | 8:59:23 | CL | SV | 80 (HTTP) | Alpha | REQUEST B |
| p6 | 8:59:25 | SV | CL | 10002 | Alpha | RESPONSE B (HTTP /1.0 200 OK) |
| p7 | 8:59:30 | CL | SV | 80 (HTTP) | Alpha | REQUEST C |
| p8 | 8:59:31 | SV | CL | 10002 | Alpha | RESPONSE C (HTTP /1.0 200 OK (Set-Cookie:Bravo) ) |
| p9 | 8:59:50 | CL | SV | 80 (HTTP) | Bravo | REQUEST D |

P₂:

| PACKET ID | Time | Src | Dst | Dst Port | Session-ID | Info |
|---|---|---|---|---|---|---|
| p1 | 8:59:59 | CL | SV | 80 (HTTP) | | LOG-IN (USER NAME:Taro) |
| p10 | 9:00:01 | SV | CL | 10002 | Delta | RESPONSE D (HTTP /1.0 200 OK) |
| p11 | 9:00:04 | CL | SV | 80 (HTTP) | Delta | REQUEST E |
| p12 | 9:00:05 | SV | CL | 10002 | Delta | RESPONSE E (HTTP /1.0 200 OK) |
| p13 | 9:00:10 | CL | SV | 80 (HTTP) | Delta | REQUEST F |
| p14 | 9:00:25 | SV | CL | 10002 | Delta | RESPONSE F (HTTP /1.0 200 OK (Set-Cookie:Echo) ) |
| p15 | 9:00:30 | CL | SV | 80 (HTTP) | Echo | REQUEST G |
| p16 | 9:00:31 | SV | CL | 10003 | Echo | RESPONSE G (HTTP /1.0 200 OK) |
| p17 | 9:00:40 | CL | SV | 80 (HTTP) | Echo | LOG-OUT |
| p18 | 9:00:41 | SV | CL | 10003 | Echo | HTTP /1.0 200 OK(USER NAME:Taro) |

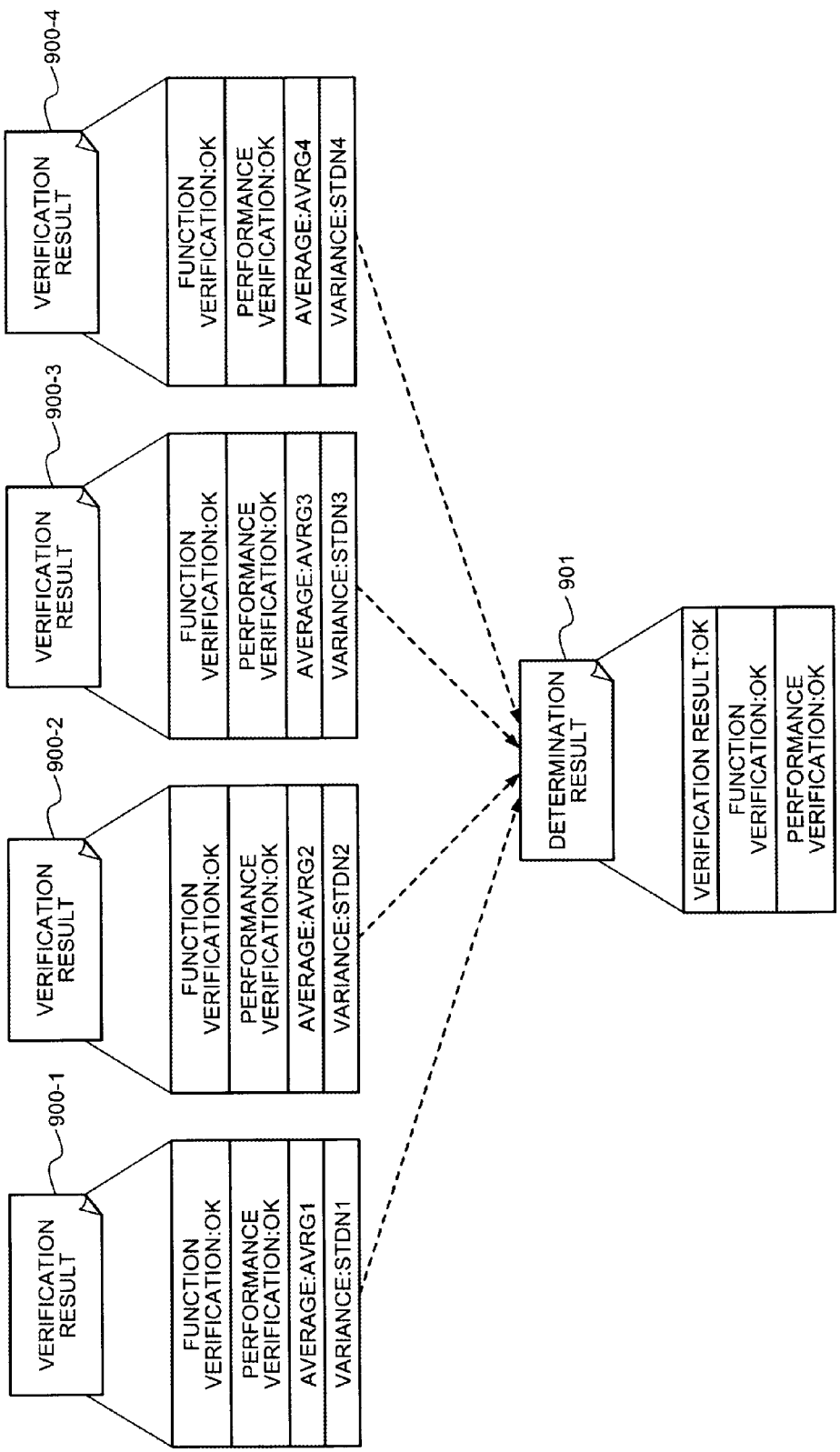

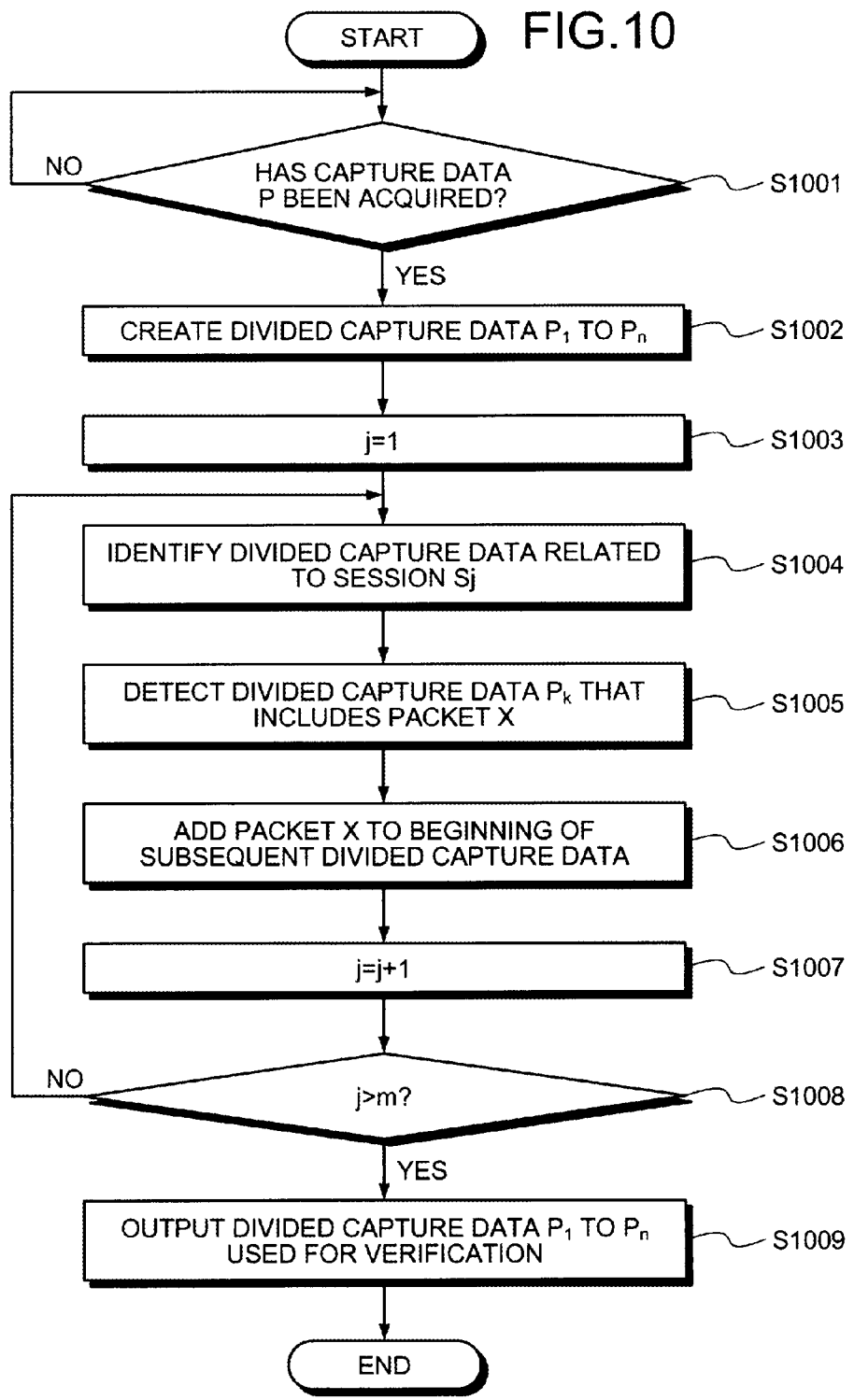

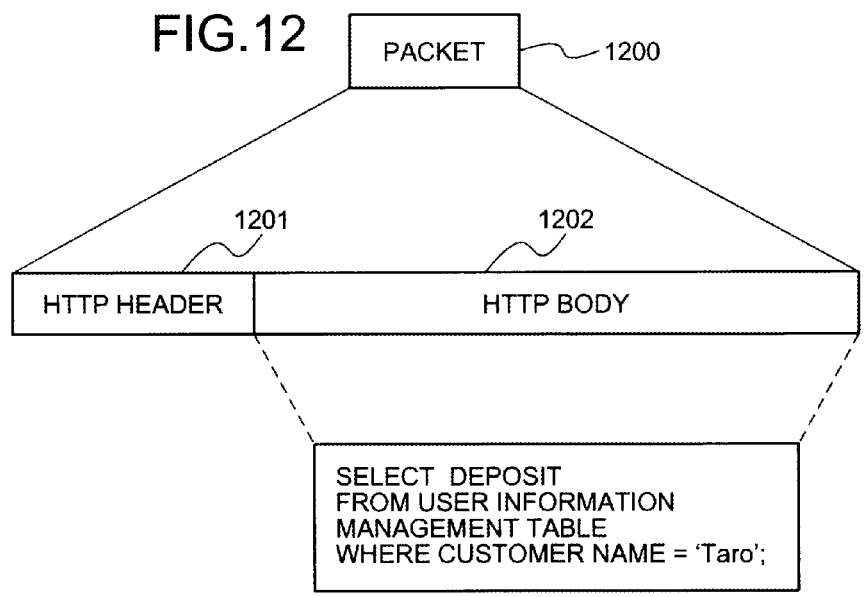
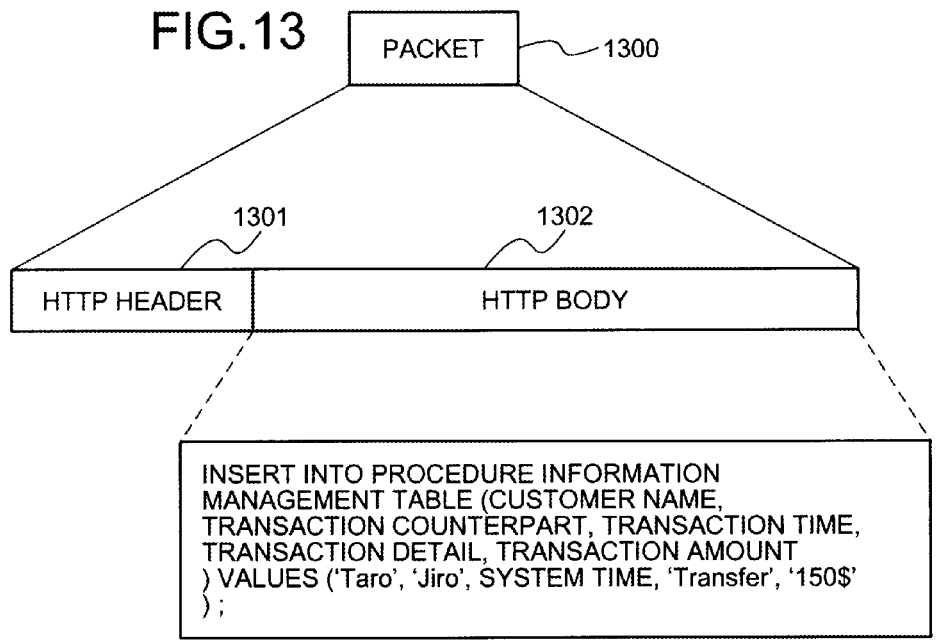

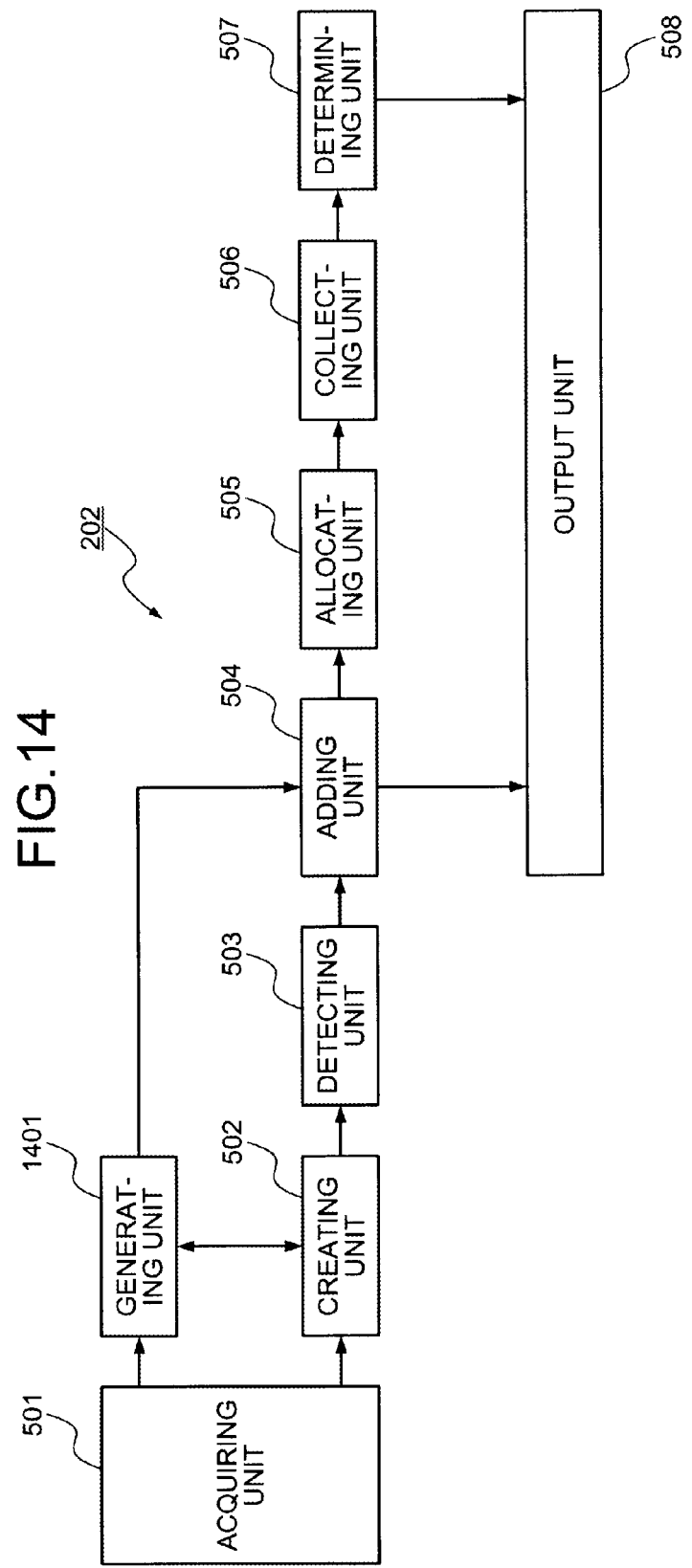

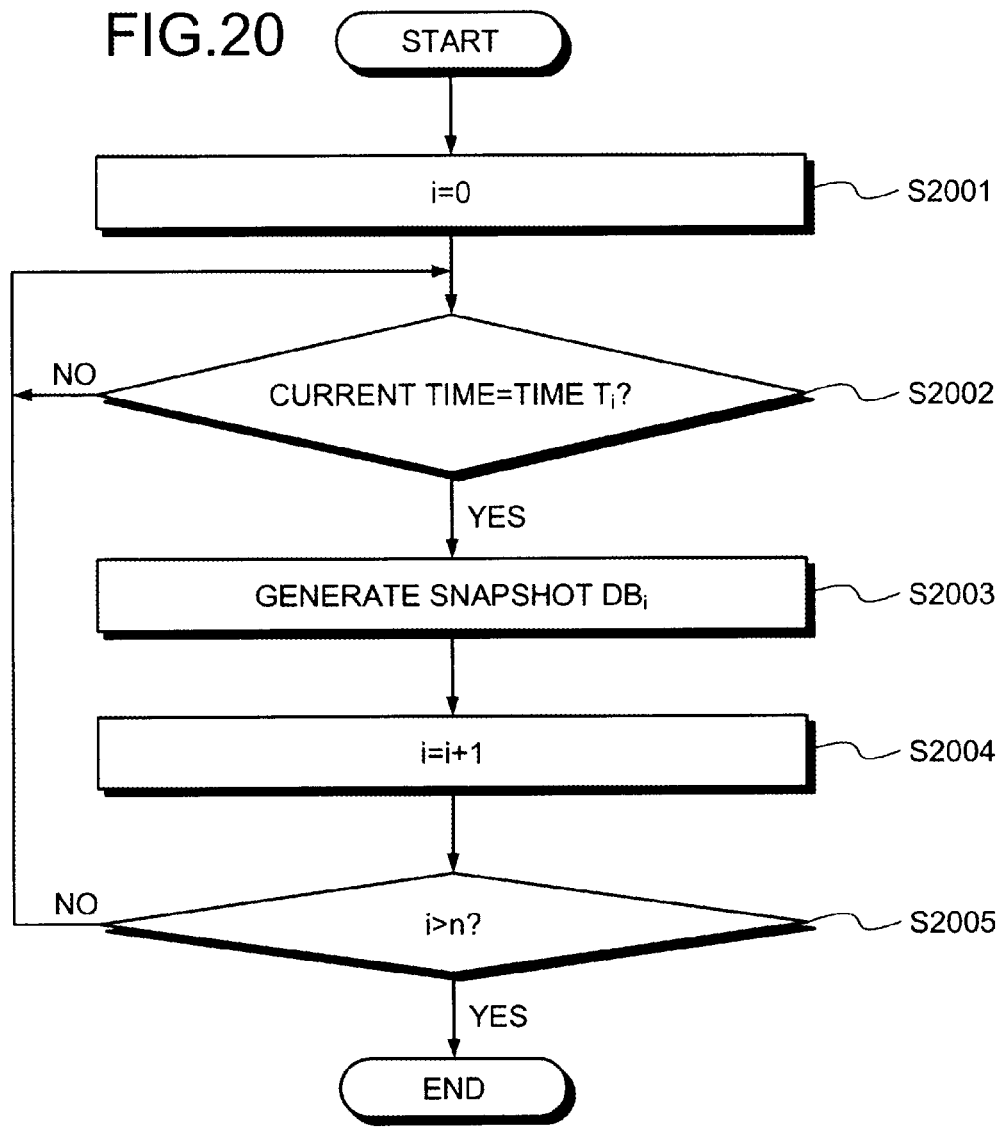

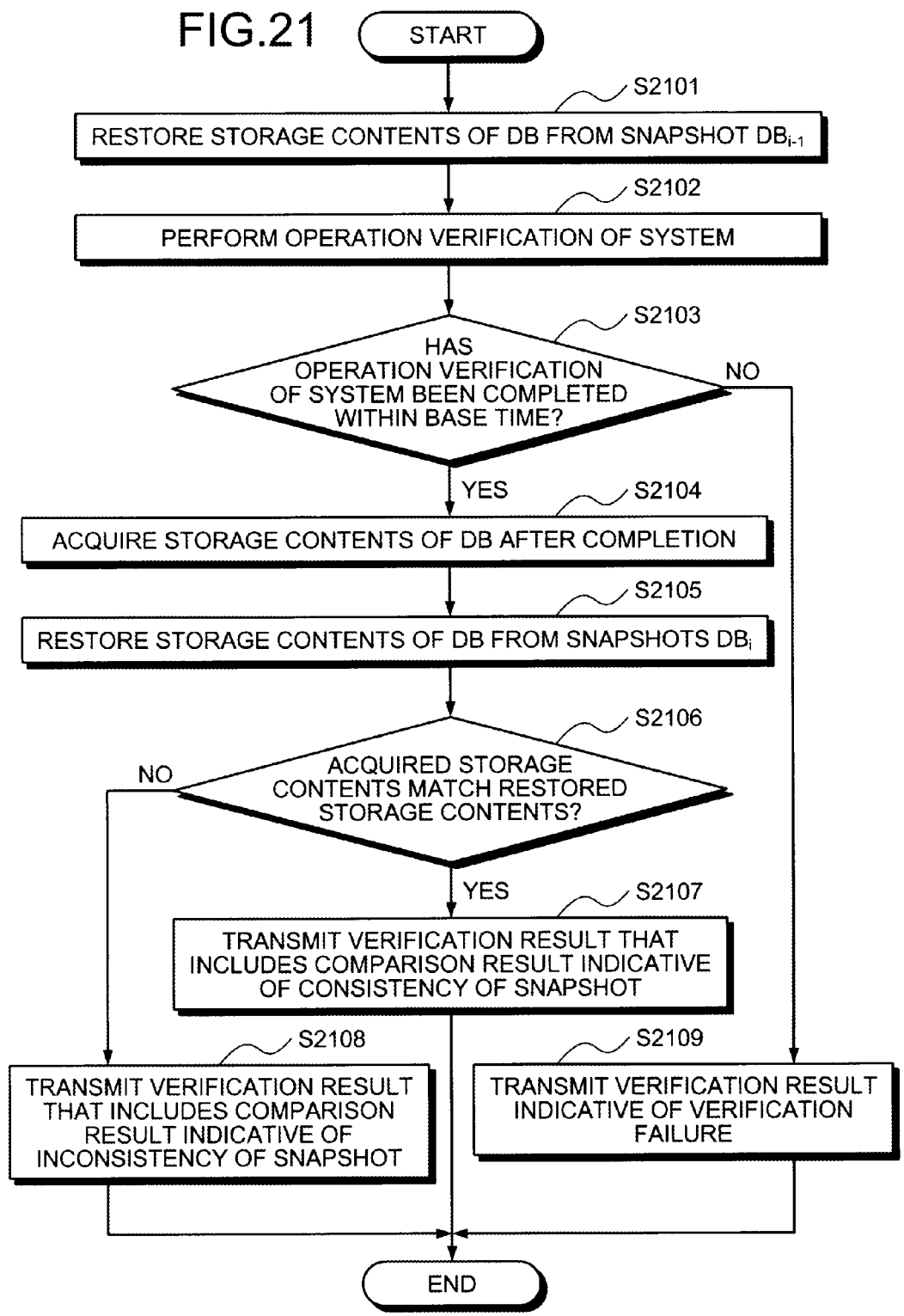

COMPUTER PRODUCT, VERIFICATION SUPPORT METHOD, AND VERIFICATION SUPPORT APPARATUS

CROSS REFERENCE TO RELATED APPLICATIONS

This application is based upon and claims the benefit of priority of the prior Japanese Patent Application No. 2012-062777, filed on Mar. 19, 2012, the entire contents of which are incorporated herein by reference.

FIELD

The embodiments discussed herein are related to a verification support program, a verification support method, and a verification support apparatus.

BACKGROUND

In a field of verifying the performance and function of a system, a technique exists that prepares a verification system separately from a working system to verify the performance and function by applying the same load as the working system to the verification system.

Related prior arts include, for example, a technique of executing a reproduction test of occurrence of a failure by performing retransmission at the same timing as actual distribution intervals and performing high speed retransmission at short telegram message intervals for a part not required to be reproduced to perform simulation (hereinafter referred to as "conventional technique 1"). A further technique involves canceling the debugging of a program and setting a past program execution environment to restore debugging setting information effective at the time point to which the program execution environment goes back. For example, a further technique involves continuously transmitting packets from a main server without waiting for a response from a remotely located backup server to cause the backup server to execute the same processing at the same timing as the main server.

For examples of the above conventional techniques, refer to Japanese Laid-open Patent Publication Nos. 2010-81194, H11-110253, and 2011-199680.

However, the conventional techniques have a problem of difficulty in shortening of the verification period when the performance and function of a system under test are verified by applying the same load as the working system. For example, in the conventional technique 1, since telegram messages are transmitted to the verification system at intervals shorter than the telegram message intervals of the working system, if a verification test is executed by maintaining the load of the verification system, the shortening of the interval has limitations and the telegram message interval can only be made shorter in a limited portion.

SUMMARY

According to an aspect of an embodiment, a computer-readable recording medium store a program that causes a computer to execute a verification support process that includes acquiring a series of data transmitted and received between apparatuses; creating a plurality of data groups by dividing the series of acquired data; detecting among the created data groups, a data group that includes given data acting as an issuance request for identification information of a transmission source; adding the given data to the beginning of subsequent data groups that are among the created data groups and transmitted after the detected data group; and outputting the subsequent data groups to which the given data has been added.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view of an example of capture data;

FIG. 5 is a block diagram of an example of a functional configuration of a test management apparatus 202 according to the first embodiment;

FIG. 6 is an explanatory view (Part 1) of an example of the creation of divided capture data;

FIG. 8 is an explanatory view of an example of adding packet X;

FIG. 9 is an explanatory view (part 1) of examples of a verification result and a determination result;

FIG. 10 is a flowchart of an example of a verification support process procedure of the test management apparatus 202 according to the first embodiment;

FIGS. 12 and 13 are explanatory views of examples of packets indicative of an operation with respect to a database (DB);

FIG. 14 is a block diagram of an example of a functional configuration of the test management apparatus 202 according to a second embodiment;

FIG. 20 is an explanatory view of an example of a generation process procedure of the test management apparatus 202 according to the second embodiment; and FIG. 21 is a flowchart of an example of a verification process procedure of a test apparatus 203-$i$ according to the second embodiment.

DESCRIPTION OF EMBODIMENTS

Preferred embodiments of the present invention will be explained with reference to the accompanying drawings.

Figure 1:
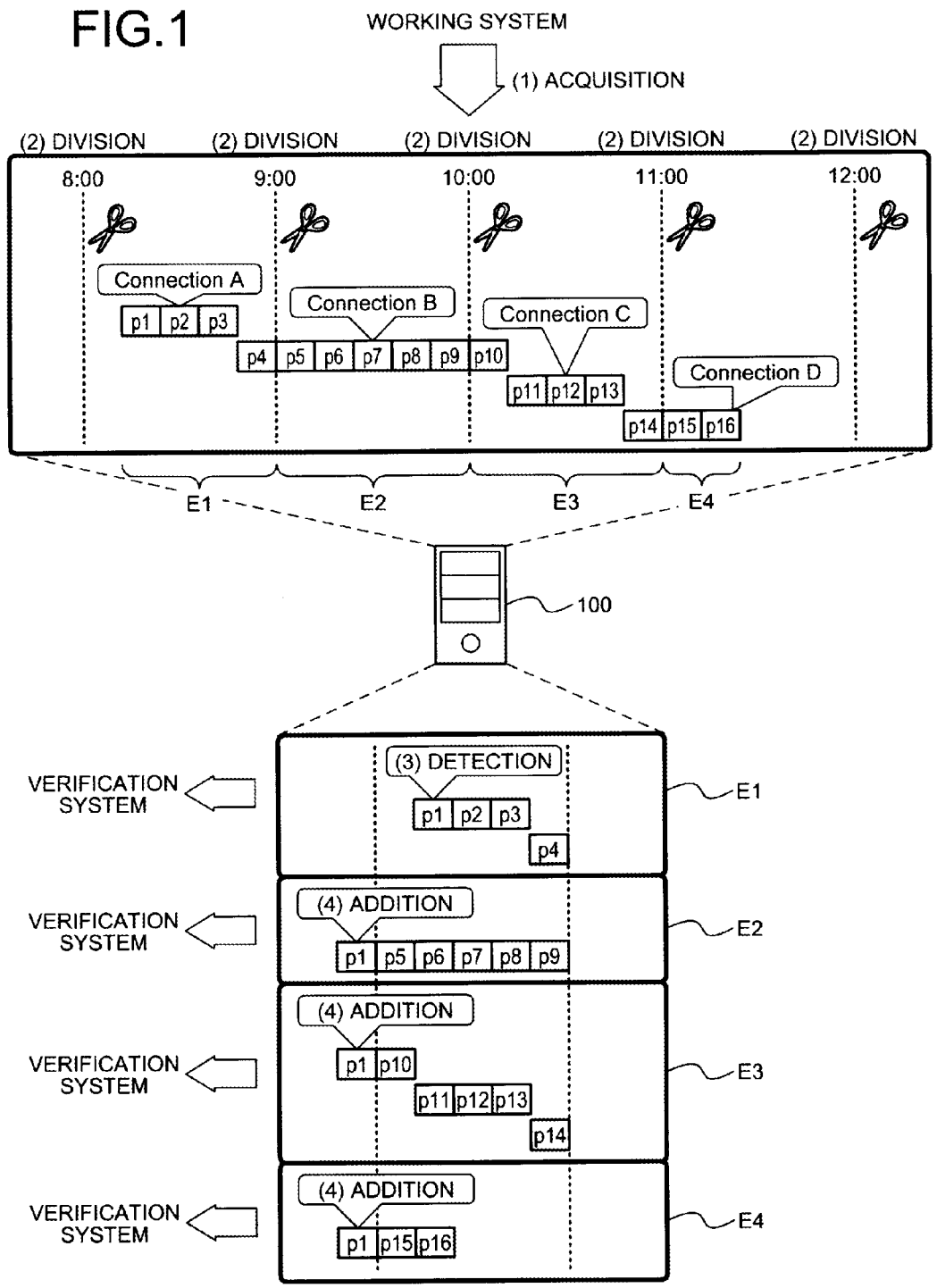
FIG. 1 is an explanatory view of an example of a verification support method according to a first embodiment.

FIG. 1 is an explanatory view of an example of a verification support method according to a first embodiment. In FIG. 1, a verification support apparatus 100 is a computer supporting operation verification of a system under test. The system under test is a system simulating a working system actually in operation.

The operation verification of a system under test means verification of the function and performance of the system under test. For example, a load identical to that of the working system is applied to the system under test by transmitting and receiving data identical to the data transmitted and received between apparatuses of the working system in the system under test, to verify the function and performance.

For example, if work such as applying a patch to a server and updating firmware is performed, verification is performed to confirm whether the server after the work operates in the same way as before the work in the system under test. Data communicated during a period when failure occurred is extracted from actual transaction data and operation at the time of the failure is reproduced in the system under test to verify the cause of the failure. In the case of system migration, verification is performed on whether apparatuses after the system migration operate normally in the system under test without stopping the working system.

The data transmitted and received between apparatuses of the working system is, for example, a packet transmitted and received between the apparatuses of the working system. The data may be message data reconstructed by analyzing multiple packets transmitted and received between the apparatuses of the working system.

For example, the verification support apparatus 100 can utilize a mirroring function of a switch apparatus included in the working system to acquire the data transmitted and received between apparatuses of the working system. The mirroring is a function in which data identical to data output to one port is output from another port.

In the following description, a "packet" is taken as an example of the data transmitted and received between apparatuses of the working system. A group of packets acquired by utilizing the mirroring function, etc. of the switch apparatus of the working system may also be referred to as "capture data".

By preparing multiple verification systems for one working system, the load required for the operation verification of the system under test can be distributed to the multiple verification systems so as to perform the operation verification of the system under test in parallel. For example, by dividing capture data into n items and respectively allocating the resulting capture data to n verification systems, the operation verification of the system under test can be performed in parallel to achieve a reduction in the verification period.

On the other hand, if a given session is continued at the time of division of capture data, the session extends over the divided capture data. A session is a series of processes executed between apparatuses. In this case, the divided capture data may lack information necessary for maintaining the session and a series of processes executed between apparatuses of the working system may not be reproduced between apparatuses of the verification system.

For example, FIG. 1 depicts packets p1 to p16 transmitted and received from eight o'clock to twelve o'clock between apparatuses of the working system. The packets p1 to p16 are a series of packets related to a session S executed between a client apparatus and a server of the working system.

The session S includes connections A to D. A connection is a logical communication path for performing data transfer in a session between apparatuses. One session has one or more connections. In this example, the connection A includes the packets p1 to p3; the connection B includes the packets p4 to p10; the connection C includes the packets p11 to p13; and the connection D includes the packets p14 to p16.

The session S is started by a log-in process during the connection A and continues until a log-out process during the connection D. For example, the server issues a session ID in response to transmission of the packet p1 from the client apparatus to the server, and the session S between the client apparatus and the server is maintained by using this session ID.

The session ID is identification information identifying a transmission source and is, for example, Cookie information of HyperText Transfer Protocol (HTTP) identifying the user of the client apparatus. The session ID is information for maintaining the session S executed between the apparatuses.

It is hereinafter assumed that the packets p1 to p16 are divided, by a time span of one hour from the reference time of eight o'clock, into packet groups E1 to E4, which are respectively distributed to different verification systems so as to perform the operation verification of the system under test.

In this case, the packet group E1 from eight o'clock to nine o'clock includes the connection A and the connection B. The packet group E2 from nine o'clock to ten o'clock includes the connection B. The packet group E3 from ten o'clock to eleven o'clock includes the connection B, the connection C, and the connection D. The packet group E4 from eleven o'clock to twelve o'clock includes the connection D.

Among the packet groups E1 to E4, the session ID is issued for the packet group E1 in which the log-in process is executed. Therefore, the connections included in the packet groups E2 to E4 lack information for maintaining the session S and inconsistency may occur during the verification.

In other words, if the packets p1 to p16 are divided according to one-hour intervals, the session S continues at the time of each division of the packets p1 to p16 and therefore, the session S extends over the packet groups E1 to E4, thereby making it difficult to reproduce the process executed between apparatuses of the working system by using the packet groups E2 to E4 between apparatuses of the verification system.

Therefore, in the first embodiment, the verification support apparatus 100 interpolates at a position of a missing packet that acquires information for maintaining a session between apparatuses, the packet from among multiple packet groups divided from a series of packets transmitted and received in the working system. As a result, when distributed processing of a verification test is executed in multiple verification systems, a process executed between apparatuses of the working system becomes reproducible. One example of the verification support process procedure of the verification support apparatus 100 will be described.

(1) The verification support apparatus 100 acquires a series of packets transmitted and received between apparatuses of the working system. In the example of FIG. 1, the packets p1 to p16 transmitted and received between the client apparatus and the server of the working system are acquired.

(2) The verification support apparatus 100 divides the series of the acquired packets to create multiple packet groups. In the example of FIG. 1, the packets p1 to p16 are divided by a period limited by a time span of one hour from the reference time of eight o'clock to create the packet groups E1 to E4.

(3) The verification support apparatus 100 detects among the created multiple packet groups, a packet group that includes a given packet acting as an issuance request for identification information of a transmission source. The given packet is, for example, a packet acting as an issuance request for Cookie information identifying a user of the client apparatus. In the example of FIG. 1, the Cookie information is issued in response to the transmission of the packet p1 from the client apparatus to the server and therefore, the packet p1 is the given packet. Therefore, the packet group E1, which includes the packet p1, is detected from among the packet groups E1 to E4.

(4) The verification support apparatus 100 adds the given packet to the beginning of subsequent packet groups among the multiple packet groups and transmitted after the detected packet group. In the example of FIG. 1, the subsequent packet groups transmitted after the packet group E1 are the packet groups E2 to E4. Therefore, the packet p1 is added to the beginning of the packet group E2; the packet p1 is added to the beginning of the packet group E3; and the packet p1 is added to the beginning of the packet group E4.

As described, the verification support apparatus 100 according to the first embodiment can create the verification data for distributed processing of a verification test of a system under test in multiple verification systems. As a result, the distributed processing of the verification test of the system under test can be executed in the multiple verification systems to achieve a reduction in the verification period.

In the example of FIG. 1, the packet group E1 and the packet groups E2 to E4 having the packet p1 added thereto can be allocated respectively to the separate verification systems to execute distributed processing of the verification test of the system under test. Since the packet p1 is transmitted first and a session ID is issued in each of the verification systems in this case, sessions between apparatuses can be maintained in each of the verification systems and processes executed between apparatuses of the working system can be reproduced.

Figure 2:
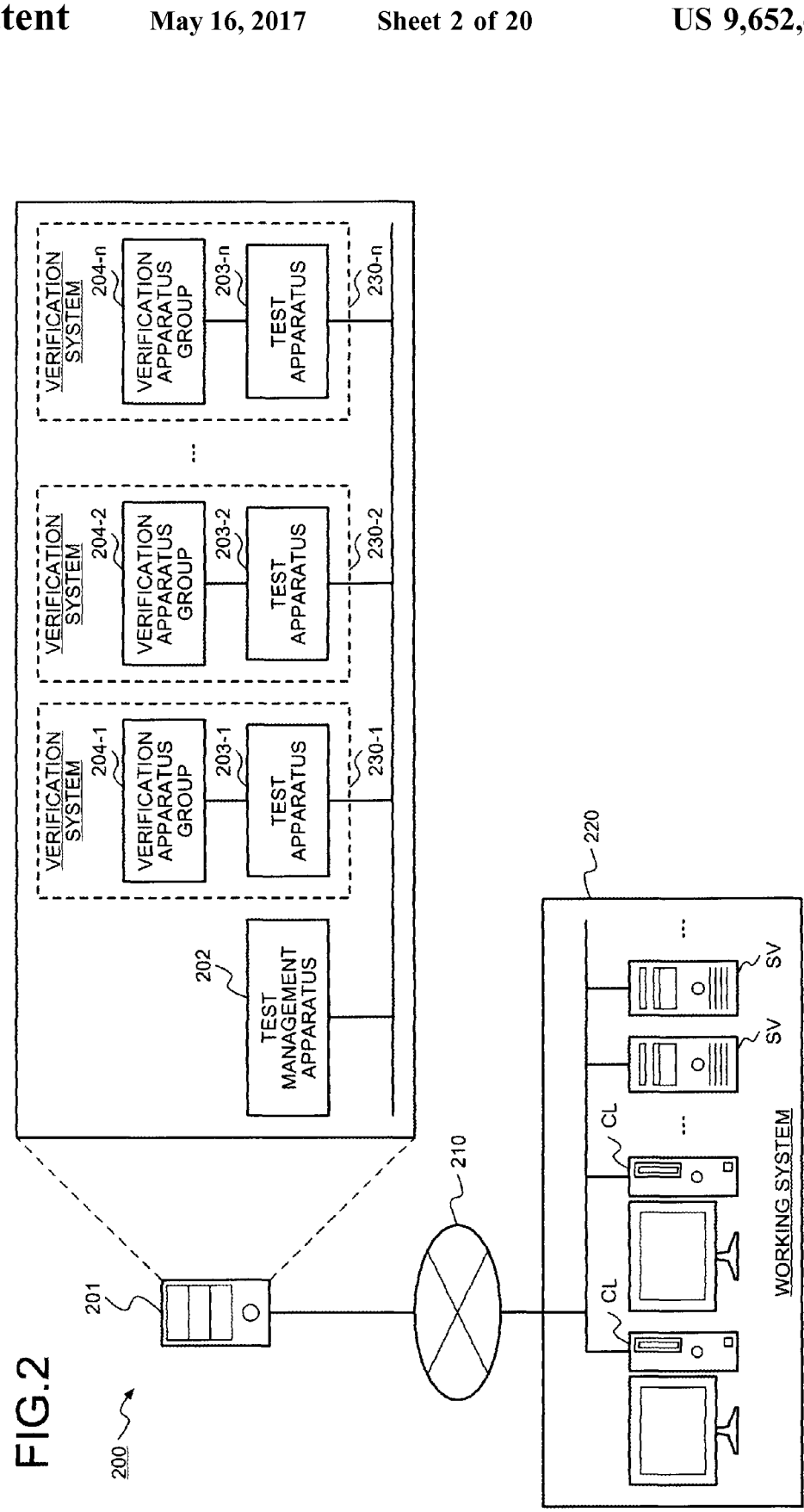
FIG. 2 is an explanatory view of an example of system configuration of a test system 200.

A test system 200 according to the first embodiment will be described. FIG. 2 is an explanatory view of an example of system configuration of the test system 200. In FIG. 2, the test system 200 includes a verification test apparatus 201, client apparatuses CL, and servers SV. In the test system 200, the verification test apparatus 201, the client apparatuses CL, and the servers SV are connected via a wired or wireless network 210. The network 210 is, for example, the Internet, a local area network (LAN), a wide area network (WAN), etc.

The verification test apparatus 201 is a computer performing the operation verification of the system under test. The system under test is a system simulating a working system 220, for example. The working system 220 is a client-server type system including the client apparatuses CL and the servers SV. The client apparatuses CL are computers used by users subscribing to web services, for example. The servers SV are computers such as a web server, an application server, and a database server, for example.

The verification test apparatus 201 can virtualize the hardware resource of the verification test apparatus 201 to run different operating systems (OSs). For example, the verification test apparatus 201 can activate OSs with virtual machines (VMs) operating in execution environments established by dividing the hardware resource of the verification test apparatus 201. Alternatively, the verification test apparatus 201 and the servers (such as a web server, an application server, and a database server) can be constructed on different physical machines without virtualizing the hardware resource.

The virtual machines are virtual computers operating in the execution environments established by dividing the hardware resource of the verification test apparatus 201. The entities of the virtual machines include, for example, software such as programs and OSs, variables given to the software, and information specifying hardware resource for executing the software.

In this example, the verification test apparatus 201 includes a test management apparatus 202, test apparatuses 203-1 to 203-n, and verification apparatus groups 204-1 to 204-n (n: natural number greater than or equal to 1).

The test management apparatus 202 is a virtual machine supporting the system operation verification. The test management apparatus 202 can capture packets transmitted and received between apparatuses of the working system 220 by utilizing a mirroring function of a switch apparatus (not depicted) in the working system 220, for example. The test management apparatus 202 corresponds to the verification support apparatus 100 depicted in FIG. 1.

The test apparatuses 203-1 to 203-n are virtual machines performing the operation verification of the system under test in conjunction with the verification apparatus groups 204-1 to 204-n. The verification apparatus groups 204-1 to 204-n are virtual machines for constructing a system simulating the working system 220. In this example, a pair of a test apparatus 203-i and a verification apparatus group 204-i forms one verification system 230-i (i=1, 2, . . . , n).

Although the test management device 202, the test apparatuses 203-1 to 203-n, and the verification apparatus groups 204-1 to 204-n are virtual machines operating on the verification test apparatus 201 in the description, the apparatuses may respectively be implemented by different physical computers.

Figure 3:
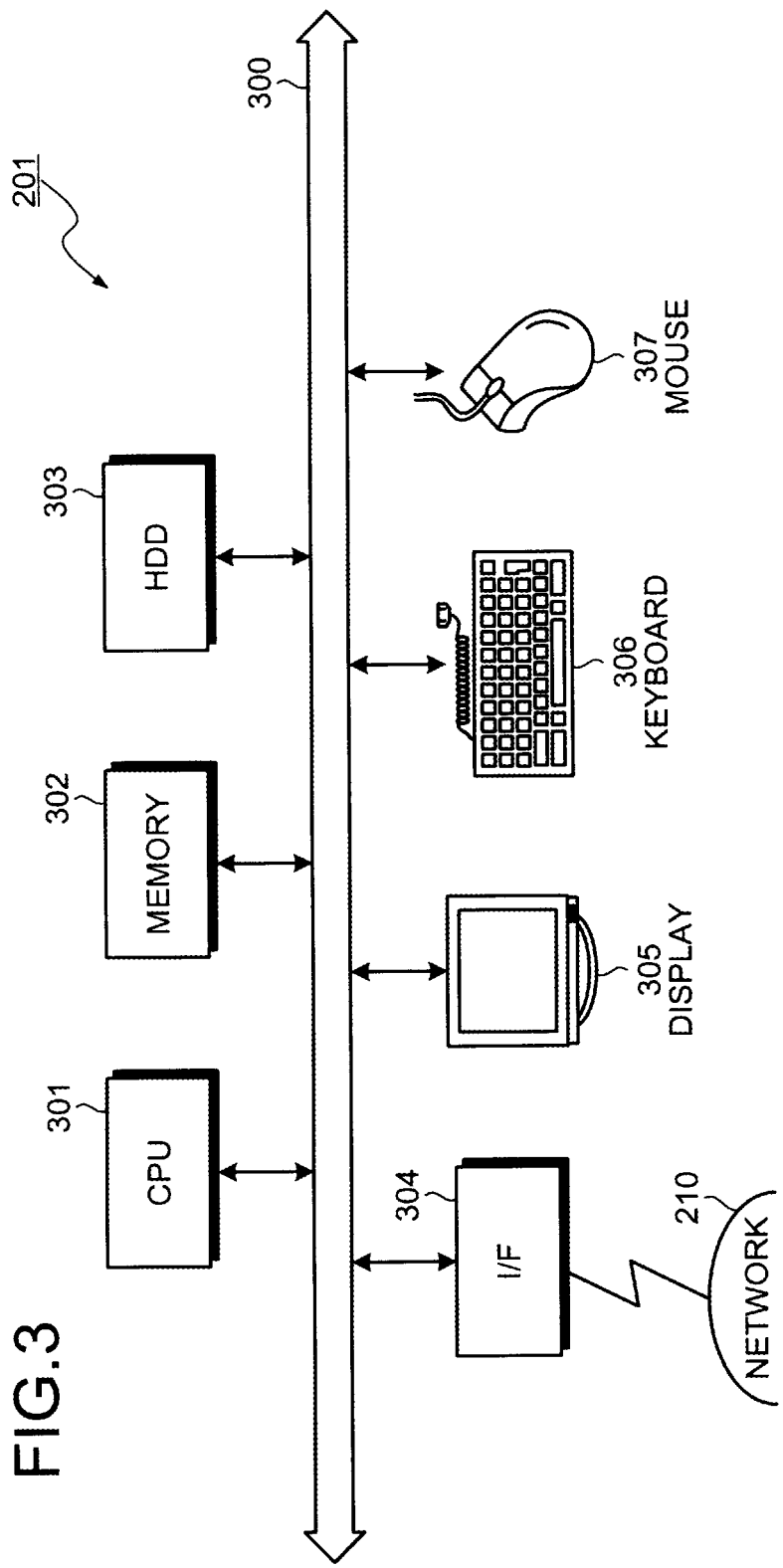
FIG. 3 is a block diagram of a hardware configuration of a verification test apparatus 201.

FIG. 3 is a block diagram of a hardware configuration of the verification test apparatus 201 according to the embodiments. As depicted in FIG. 3, the verification test apparatus 201 includes a central processing unit (CPU) 301, memory 302, a hard disk drive (HDD) 303, an interface (I/F) 304, a display 305, a keyboard 306, and a mouse 307, respectively connected by a bus 300.

The CPU 301 governs overall control of the verification test apparatus 201. The memory 302 includes, for example read-only memory (ROM), random access memory (RAM), and flash ROM. For example, flash ROM and/or ROM stores various types of programs. The RAM is used as a work area of the CPU 301. Programs stored in the memory 302 are loaded on the CPU 301, whereby encoded processes are executed on the CPU 301.

The HDD 303, under the control of the CPU 301, controls the reading and writing of data with respect to a magnetic disk. The I/F 304 is connected to the network 210 through a communication line and is connected to other apparatuses through the network 210. The I/F 304 administers an internal interface with the network 210 and controls the input/output of data from/to external apparatuses. The I/F 304 includes a virtual I/F and connects virtual machines operating on the verification test apparatus 201. A modem, a LAN adaptor, virtual network interface card (NIC), etc. may be employed as the I/F 304.

The display 305 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 305. The keyboard 306 includes, for example, keys for inputting letters, numerals, and various instructions and performs the input of data. The mouse 307 is used to move the cursor, select a region, or move and change the size of windows. A track ball or a joy stick may be adopted provided each respectively has a function similar to a pointing device. In addition to the components above, the verification test apparatus 201 may include, for example, a scanner, a printer, etc.

An example of capture data used by the test management apparatus 202 will be described. The capture data is data acquired by capturing the packets transmitted and received between the client apparatuses CL and the servers SV in the working system 220.

FIG. 4 is an explanatory view of an example of capture data. In FIG. 4, capture data 400 has fields of Packet ID, Time, Src, Dst, Dst_Port, Session-ID, and Info. By entering information into the fields, records of the packets (e.g., packets p1 to p18) transmitted and received between apparatuses of the working system 220 are stored.

Packet ID is identification information identifying a packet. Time is the capture time when the packet is captured. Src is an Internet Protocol (IP) address of an apparatus that is the transmission source of the packet. In FIG. 4, Src is described as "CL" or "SV" indicating that the transmission source is the client apparatus CL or the server SV.

Dst is an IP address of an apparatus that is a destination of a packet. In FIG. 4, Dst is described as "CL" or "SV" indicating that the destination is the client apparatus CL or the server SV. Dst_Port is a port number of an apparatus that is the destination of the packet.

Session-ID is Cookie information identifying a user of the client apparatus CL. The cookie information includes, for example, a cookie name, a value thereof, a domain name, a path name, an expiration date, creation date and time, and the IP address of the client apparatus CL. Info is information indicative of process details and a process result of a process requested to an apparatus that is the destination of the packet. Although not depicted, each packet may indicate the type of the packet (request or response), a port number of an apparatus that is the transmission source of the packet, and packet length representative of the data size of the packet.

An operation example of the client apparatus CL and the server SV will be described by taking the packets p1 and p2 as an example. First, when the packet p1 is transmitted from the client apparatus CL to the server SV, the server SV executes a log-in process of a user name: Taro. Once the log-in process is completed, Session-ID "Alpha" is issued in a Set-Cookie process of the server SV and the packet p2 including Session-ID "Alpha" is transmitted from the server SV to the client apparatus CL.

As a result, the server SV can subsequently identify the user of the client apparatus CL by including Session-ID "Alpha" into the packets transmitted and received between the client apparatus CL and the server SV. Session-ID is regularly updated in a Set-Cookie process of the server SV, for example.

FIG. 5 is a block diagram of an example of a functional configuration of the test management apparatus 202 according to the first embodiment. In FIG. 5, the test management apparatus 202 includes an acquiring unit 501, a creating unit 502, a detecting unit 503, an adding unit 504, an allocating unit 505, a collecting unit 506, a determining unit 507, and an output unit 508. The acquiring unit 501 to the output unit 508 are functions acting as a control unit and, for example, are implemented by the CPU 301 executing programs stored in the memory 302, the HDD 303, etc. depicted in FIG. 3 or by the I/F 304. For example, the process results of the functional units are stored to the memory 302, the HDD 303, etc.

The acquiring unit 501 has a function of acquiring a series of packets transmitted and received between apparatuses. The series of packets is a time-series packet group transmitted and received between apparatuses and is, for example, a packet group related to a session executed between apparatuses.

For example, the acquiring unit 501 captures packets transmitted and received between apparatuses of the working system 220 to acquire capture data including a series of packets. The acquiring unit 501 may acquire the capture data including a series of packets by user input via the keyboard 306 and the mouse 307 depicted in FIG. 3 or by extraction from a database.

The capture data is a group of packets for a predetermined period (e.g., one day, one week) and includes a series of packets related to one or more sessions, for example. For example, the capture data is the capture data 400 depicted in FIG. 4.

The creating unit 502 has a function of dividing the series of acquired packets to create multiple packet groups. For example, the creating unit 502 divides the acquired capture data to create multiple divided capture data. The minimum unit of division of the capture data is one packet, for example.

For example, the number of the divided capture data divided from the capture data may be set in advance. For example, the number of the divided capture data may be calculated from the maximum verification time available for the verification test or the maximum number of the verification systems 230-$i$ and may be stored in the memory 302, the HDD 303, etc.

For example, the creating unit 502 may divide the capture data from a reference time, by a given time span based on the transmission times of respective packets included in the capture data. In this case, the reference time is the start time of a verification period during which the operation verification of the system under test is performed, for example. The transmission times of the packets correspond to the capture times of the packets, for example.

For example, the creating unit 502 may divide the capture data, based on the data size of each of the packets included in the capture data such that the data size of a resulting capture data unit is set to a predetermined value from the reference time. The data size of the resulting capture data unit is a size acquired by summing the lengths of packets included in divided capture data, for example. An example of creation of divided capture data will be described later with reference to FIGS. 6 and 7.

In the following description, acquired capture data may also be referred to as "capture data P". Multiple divided capture data divided from the capture data P may also be referred to as "divided capture data $P_1$ to $P_n$". Arbitrary divided capture data among the divided capture data $P_1$ to $P_n$ may also be referred to as "divided capture data $P_i$".

The captured data P includes a group of packets related to one or more sessions and one or more sessions may also be referred to as "sessions S1 to Sm". An arbitrary session among the sessions S1 to Sm may also be referred to as "session Sj" (j=1, 2, . . . , m).

The detecting unit 503 has a function of detecting among the created divided capture data $P_1$ to $P_n$, divided capture data that include a given packet acting as an issuance request for identification information of a transmission source. This given packet is, for example, a packet acting as an issuance request for a session ID identifying a session Sj executed between apparatuses of the working system 220.

Describing in more detail, the given packet is, for example, a packet acting as an issuance request for cookie information identifying the user of the client apparatus CL. Therefore, the given packet is, for example, a packet transmitted from the client apparatus CL to the server when the user of the client apparatus CL logs in.

For example, the detecting unit 503 performs lexical analysis of information of Info, for example, a query character string or a session object, of each packet included in each of the divided capture data $P_i$, to detect the given packet that includes a character string "log-in". The detecting unit 503 detects among the divided capture data $P_1$ to $P_n$, divided capture data that includes the given packet In the following description, the given packet may also be referred to as "packet X". The divided capture data that includes the packet X may also be referred to as "divided capture data $P_k$" (k=1, 2, . . . , n).

The adding unit 504 has a function of adding the packet X to the beginning of subsequent divided capture data among the divided capture data $P_1$ to $P_n$ and transmitted after the divided capture data $P_k$. The subsequent divided capture data are divided capture data among the divided capture data $P_1$ to $P_n$ and include packets having transmission times after the packets included in the divided capture data $P_k$.

For example, the adding unit 504 may rewrite the transmission time of the packet X such that the transmission time of the packet X becomes the oldest in each of the subsequent divided capture data, to thereby add the packet X to each of the subsequent divided capture data.

The divided capture data $P_k$ may include multiple packets X. In this case, the adding unit 504 may add to the beginning of the subsequent capture data, the latest packet X among the multiple packets X included in the divided capture data $P_k$.

Multiple divided capture data that include the packets X may be detected. It is assumed that divided capture date $P_k$ that includes a packet X1 and divided capture date $P_{k+2}$ that includes a packet X2 are detected among the divided capture data $P_1$ to $P_n$.

In this case, for example, the adding unit 504 may add the packet X1 to the beginning of divided capture date $P_{k+1}$ and the divided capture date $P_{k+2}$, and may add the packet X2 to the beginning of the divided capture data $P_{k+3}$ to $P_n$. In other words, the packet X added to given divided capture data is the latest packet X among the packets X transmitted before the packets included in the divided capture data.

The capture data P may include a group of packets related to two or more sessions. In this case, for example, for each session Sj, the adding unit 504 may add the packet X to the beginning of divided capture data subsequent to the divided capture data $P_k$ that includes the packet X, among the divided capture data that include a series of packets related to the session Sj.

In a group of the capture data P, a series of packets related to the session Sj can be identified from the IP address of the client apparatus CL, the IP address of the server SV, and the session ID, for example. Multiple IP addresses or domain names of the servers SV may exist. In the capture data P, a series of packets related to the session Sj may be defined from a packet including a character string "log-in" in Info to a packet including a character string "log-out". For example, a series of packets related to each session Sj may be specified in the capture data P through operation input by a user using the keyboard 306 and the mouse 307. An example of adding the packet X will be described later with reference to FIG. 8.

The allocating unit 505 has a function of respectively allocating to the test apparatuses 203-1 to 203-n, the divided capture data $P_1$ to $P_n$ having the packet X added to the beginning of the subsequent divided capture data. The test apparatus 203-i is a computer performing the operation verification of the system under test (see FIG. 2).

For example, first, the allocating unit 505 activates the test apparatuses 203-1 to 203-n of a number corresponding to the number of the divided capture data $P_1$ to $P_n$. The allocating unit 505 allocates to each test apparatus 203-i among the test apparatuses 203-1 to 203-n, a divided capture data $P_i$ among the divided capture data $P_1$ to $P_n$.

The collecting unit 506 has a function of acquiring a verification result from the test apparatus 203-i as a result of performing the operation verification of the system under test, based on the divided capture data $P_i$ allocated to the test apparatus 203-i. For example, the collecting unit 506 acquires each verification result from each test apparatus 203-i among the test apparatuses 203-1 to 203-n. An example of the verification result will be described later with reference to FIG. 9.

The determining unit 507 has a function of determining whether the system under test operates normally, based on the acquired verification results. For example, the determining unit 507 determines whether the system under test operates normally, based on the verification results acquired from the test apparatuses 203-1 to 203-n. An example of the determination result will be described later with reference to FIG. 9.

The output unit 508 outputs the determination result. For example, the output unit 508 outputs a determination result 901 depicted in FIG. 9. The output unit 508 may output each verification result acquired from each test apparatus 203-i among the test apparatuses 203-1 to 203-n. The output format may be, for example, display on the display 305, print out at a printer (not depicted), transmission to an external apparatus through the I/F 304, and storage into the memory 302 or the HDD 303.

The output unit 508 may output the divided capture data $P_1$ to $P_n$ with the packet X added to the beginning of the subsequent divided capture data, thereby enabling output of the divided capture data $P_1$ to $P_n$ for verification to perform the verification test with the load distributed in verification systems 230-1 to 230-n. As a result, the operation verification of the system under test can be performed at an arbitrary timing by using the divided capture data $P_1$ to $P_n$ in the verification systems 230-1 to 230-n.

An example of the creation of the divided capture data $P_i$ will be described. First, an example of the creation of the divided capture data $P_i$ based on the transmission times of the packets will be described with reference to FIG. 6.

FIG. 6 is an explanatory view (Part 1) of an example of the creation of the divided capture data. In FIG. 6, capture data 600 is information that includes packets (e.g., packets p100 to p201) transmitted and received between apparatuses of the working system 220. It is assumed that a total time from the start time to the end time of the verification period is a "total time T_all" and that the number of the verification systems 230-i is a "division number n".

First, the creating unit 502 divides the total time T_all by the division number n to calculate a base time T_div. The creating unit 502, from the start time of the verification period, divides the capture data 600 at intervals equivalent to the base time T_div based on the capture times of the packets included in the capture data 600.

In this example, the start time of the verification period is "8:00:00" and the base time T_div is "60 [min]". In this case, the creating unit 502 divides the capture data 600 by intervals of 60 [min] from the time "8:00:00". In the example of FIG. 6, the capture data 600 is divided by an interval from the time "8:00:00" to the time "8:59:59" to create the divided capture data $P_1$ that includes the packets p100 to p199.

As a result, the divided capture data $P_1$ to $P_n$ can be created by dividing the capture data 600 such that the verification periods in the verification systems 230-$i$ become equal.

An example of the creation of the divided capture data $P_i$ based on the data amounts of the packets will be described with reference to FIG. 7.

Figure 7:
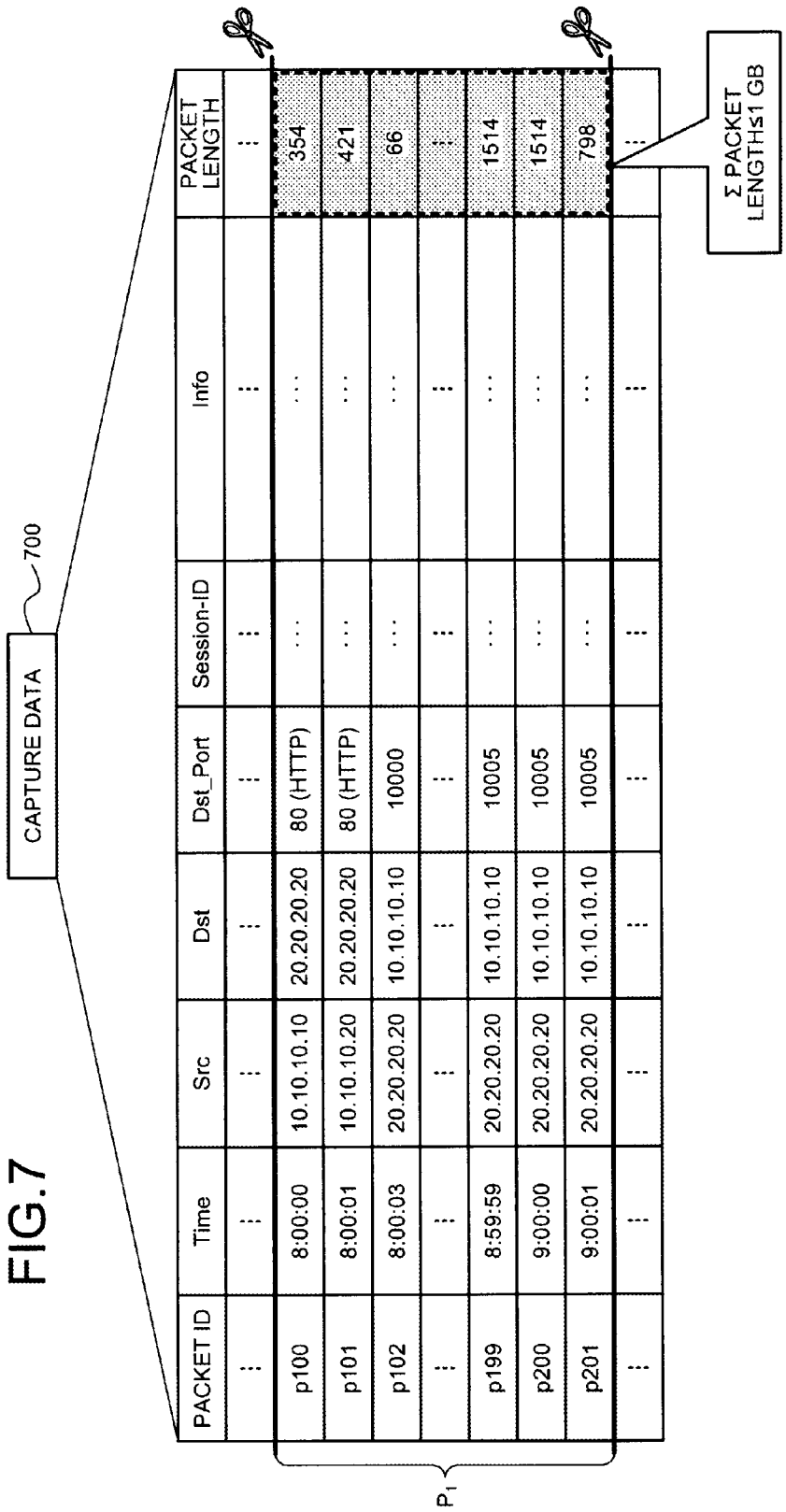
FIG. 7 is an explanatory view (Part 2) of an example of the creation of the divided capture data.

FIG. 7 is an explanatory view (Part 2) of an example of the creation of the divided capture data. In FIG. 7, capture data 700 is information that includes packets (e.g., packets p100 to p201) transmitted and received between apparatuses of the working system 220. In the capture data 700, a packet length [B (byte)] of each packet is indicated. It is assumed that the data size of the capture data 700 is a "data size S_all" and that the number of the verification systems 230-$i$ is a "division number n".

The creating unit 502 divides the data size S_all by the division number n to calculate a base size S_div. The creating unit 502, from the start time of the verification period, divides the capture data 700 such that the data size of the divided capture data unit is set to the base size S_div, based on the packet lengths of the packets included in the capture data 700.

In this example, the start time of the verification period is "8:00:00" and the base size S_div is "S_div=1 [GB]". In this case, the creating unit 502 divides the capture data 700 such that the data size of the divided capture data unit is set to 1 [GB] from the time "8:00:00". In the example of FIG. 7, the capture data 700 is divided by 1 [GB] from the time "8:00:00" to create the divided capture data $P_1$, which includes the packets p100 to p201.

As a result, the divided capture data $P_1$ to $P_n$ can be created by dividing the capture data 700 such that the data size of the divided capture data $P_i$ in the verification systems 230-$i$ become equal.

An example of adding the packet X will be described. FIG. 8 is an explanatory view of an example of adding the packet X. FIG. 8 depicts divided capture data $P_1$ and $P_2$ divided from given capture data P. It is assumed that packets p1 to p18 included in the divided capture data $P_1$ and $P_2$ are a series of packets related to a session S1.

In this case, the detecting unit 503 first detects the divided capture data $P_1$ that includes the packet p1, which is the packet X. The adding unit 504 adds the packet p1 (i.e., packet X) to the beginning of the subsequent divided capture data $P_2$ transmitted after the divided capture data $P_1$.

For example, the adding unit 504 adds the packet p1 to the divided capture data $P_2$ such that the transmission time of the packet p1, i.e., the packet X, becomes the oldest among the packets transmitted from the client apparatus CL to the server SV in the divided capture data $P_2$. In the example of FIG. 8, the capture time of the packet p1 is changed to "8:59:59" and is appended to the divided capture data $P_2$.

In this case, for example, in the operation verification of the system under test based on the divided capture data $P_2$, the packet p1 is first transmitted and received between apparatuses of the verification apparatus group 204-2. As a result, the log-in process for the user of the client apparatus CL is executed to issue a session ID, and the session is maintained between apparatuses of the verification apparatus group 204-2.

For example, a session ID "Delta" is issued through the log-in process of the packet p1 and the requests of the packets p11 and p13 are transmitted by using the session ID "Delta". A new session ID "Echo" is issued for the request of the packet p13 and the requests of the packets p15 and p17 are transmitted by using the session ID "Echo".

The session ID is issued as a result of transmission and reception of the packet X between apparatuses of the verification apparatus group 204-$i$. Therefore, in the phase before the verification, no information may be set, or a session ID identical to that before division may be set, as the session ID of the divided capture data $P_i$.

Examples of a verification result and a determination result will be described with reference to FIG. 9. In the examples, the number of the divided capture data $P_1$ to $P_n$ is "4", i.e., the capture data P is divided into four parts.

FIG. 9 is an explanatory view (part 1) of examples of a verification result and a determination result. In FIG. 9, verification results 900-1 to 900-4 represent verification results of the operation verification of the system under test acquired from the test apparatuses 203-1 to 203-4.

The verification result 900-1 indicates a verification result "OK" for function verification of the system under test, a verification result "OK" for performance verification of the system under test, and an average "AVRG1" and variance "STDN1" of page load times of the system under test.

The verification result 900-2 indicates a verification result "OK" for function verification of the system under test, a verification result "OK" for performance verification of the system under test, and an average "AVRG2" and variance "STDN2" of page load times of the system under test.

The verification result 900-3 indicates a verification result "OK" for function verification of the system under test, a verification result "OK" for performance verification of the system under test, and an average "AVRG3" and variance "STDN3" of page load times of the system under test.

The verification result 900-4 indicates a verification result "OK" for function verification of the system under test, a verification result "OK" for performance verification of the system under test, and an average "AVRG4" and variance "STDN4" of page load times of the system under test.

The verification result "OK" of the function verification indicates that the function of the system under test is normal. The verification result "NG" of the function verification indicates that the function of the system under test is abnormal. The verification result "OK" of the performance verification indicates that the performance of the system under test is normal. The verification result "NG" of the performance verification indicates that the performance of the system under test is abnormal.

Description will be made of a process example of the verification process of the test apparatus 203-$i$, related to the operation verification of the system under test based on the divided capture data $P_i$ to which the packet X has been added.

For example, as a result of the allocation of the divided capture data $P_i$, the test apparatus 203-$i$ activates the verification apparatus group 204-$i$ to perform based on the divided capture data $P_i$, the operation verification of the system under test. For example, the test apparatus 203-$i$ causes the apparatuses of the verification apparatus group 204-$i$ to transmit and receive the packets of requests included in the divided capture data $P_i$.

In this case, since the packet X has been added to the beginning of the divided capture data $P_j$, a session is maintained between the apparatuses of the verification apparatus group 204-$i$. Therefore, a series of processes executed in the working system 220 can be reproduced in the verification system 230-$i$. The header information (e.g., a transmission source IP address, a destination IP address) of the packets of requests included in the divided capture data $P_j$ is changed according to the apparatuses of the verification apparatus group 204-$i$.

The test apparatus 203-$i$ measures, for example, the number of requests, the number of responses, and a response time between the apparatuses of the verification apparatus group 204-$i$. For example, the response time is a page load time of a web page displayed on the client apparatus CL. The response time can be calculated as a time from the transmission time of a request to the transmission time of a response to the request. The test apparatus 203-$i$ may further calculate an average, variance, etc. of the response time.

For example, the test apparatus 203-$i$ next compares the number of responses in the verification apparatus group 204-$i$ and the number of responses in the working system 220 to perform the function verification of the verification apparatus group 204-$i$. For example, if the number of responses in the verification apparatus group 204-$i$ does not match the number of responses in the working system 220, the test apparatus 203-$i$ may determine that the function of the system under test is abnormal. The number of responses in the working system 220 is calculated based on the divided capture data $P_j$, for example.

In the operation verification of the system under test based on the divided capture data $P_j$ to which the packet X has been added, a response to the packet X is generated. Therefore, for example, the test apparatus 203-$i$ may calculate a value obtained by subtracting the number of responses to the packet X from the number of responses in the verification apparatus group 204-$i$ as the number of responses in the verification apparatus group 204-$i$.

The divided capture data $P_j$ divided from the capture data P may include a response having no corresponding request. Therefore, for example, the test apparatus 203-$i$ may calculate a value obtained by subtracting the number of responses having no corresponding requests from the number of responses in the working system 220 as the number of responses in the working system 220.

A correlation between a request and a response included in the capture data P is set in advance by the test management apparatus 202, for example. Therefore, the test apparatus 203-$i$ can determine the presence of a request corresponding to a response. The test management apparatus 202 may count the number of responses having corresponding requests among the responses included in the divided capture data $P_j$ and adds the resulting count to the divided capture data $P_j$, thereby eliminating the necessity of counting the number of responses at the test apparatus 203-$i$.

The test apparatus 203-$i$ may compare the response codes of the responses in the verification apparatus group 204-$i$ and the response codes of the responses in the working system 220 to measure the number of mismatches of the response codes. The response codes are, for example, status codes of HTTP. For example, if the number of mismatches of the response codes is one or more, the test apparatus 203-$i$ may determine that the function of the system under test is abnormal.

However, as described, the divided capture data $P_j$ may include a response having no corresponding request. Therefore, for example, the test apparatus 203-$i$ may exclude a response having no corresponding request among the responses of the working system 220, from the comparison objects of response codes.

For example, the test apparatus 203-$i$ may compare the average of the response times in the verification apparatus group 204-$i$ and the average of the response times in the working system 220 to perform the performance verification of the verification apparatus group 204-$i$. For example, if the difference of the average of the response times in the verification apparatus group 204-$i$ and the average of the response times in the working system 220 is greater than or equal to a predetermined value, the test apparatus 203-$i$ may determine that the performance of the system under test is abnormal.

For example, the test apparatus 203-$i$ may compare variance of the response times in the verification apparatus group 204-$i$ and variance of the response times in the working system 220 to perform the performance verification of the verification apparatus group 204-$i$. For example, if the difference of the variance of the response times in the verification apparatus group 204-$i$ and the variance of the response times in the working system 220 is greater than or equal to a predetermined value, the test apparatus 203-$i$ may determine that the performance of the system under test is abnormal.

A process example of the determination process of the determining unit 507 will be described by taking the verification results 900-1 to 900-4 as an example.

The determining unit 507 determines whether the function of the system under test is normal, based on the verification results 900-1 to 900-4. For example, if all the verification results of the function verification are "OK" in the verification results 900-1 to 900-4, the determining unit 507 determines that the function of the system under test is normal.

The determining unit 507 determines whether the performance of the system under test is normal, based on the verification results 900-1 to 900-4. For example, if all the verification results of the function verification are "OK" in the verification results 900-1 to 900-4, the determining unit 507 determines that the performance of the system under test is normal.

For example, the determining unit 507 may compare an average of response times in the verification apparatus groups 204-1 to 204-4 and an average of response times in the working system 220 to perform the performance verification of the system under test. The average of the response times in the working system 220 is calculated based on the capture data P, for example.

For example, the determining unit 507 can calculate the average of the response times in the verification apparatus groups 204-1 to 204-4 by using Equation (1). In this equation, AVG is the average of the response times of all the verification apparatus groups 204-1 to 204-4. $AVG_i$ is the average of the response times in the verification apparatus group 204-$i$.

$$AVRG = \sum_{i=1}^{n}(RES_i \times AVRG_i) \bigg/ \sum_{i=1}^{n} RES_i \qquad (1)$$

If the difference of the average response time AVRG of all the verification apparatus groups 204-1 to 204-4 and the average response time R of the entire working system 220 is greater than or equal to a predetermined value, the determining unit 507 may determine that the performance of the system under test is abnormal. In this case, even if a verification result of the performance verification is "NG" in the verification results 900-1 to 900-4, when the difference of the average response time AVRG and the average response time R is less than the predetermined value, the determining unit 507 determines that the performance of the system under test is normal.

For example, the determining unit 507 may compare variance of the response times in the verification apparatus groups 204-1 to 204-4 and variance of the response times in the working system 220 to perform the performance verification of the system under test. The variance of the response times in the working system 220 is calculated based on the capture data P, for example.

For example, the determining unit 507 can calculate the variance of the response times in the verification apparatus groups 204-1 to 204-4 by using Equation (2). In this equation, STDN is variance of the response times of all the verification apparatus groups 204-1 to 204-4. $STDN_i$ is variance of the response times in the verification apparatus group 204-$i$.

$$STDN = \sum_{i=1}^{n} STDN_i \qquad (2)$$

If a difference of the variance STDN of the response times of all the verification apparatus groups 204-1 to 204-4 and the variance S of the response times of the entire working system 220 is greater than or equal to a predetermined value, the determining unit 507 may determine that the performance of the system under test is abnormal. In this case, even if any verification result of the performance verification is "NG" in the verification results 900-1 to 900-4, when the difference of the variance STDN and the variance S is less than the predetermined value, the determining unit 507 determines that the performance of the system under test is normal.

The determining unit 507 determines whether the operation of the system under test is normal, based on the verification result of the function verification of the system under test and the verification result of the performance verification of the system under test. For example, if the function of the system under test is normal and the performance of the system under test is normal, the determining unit 507 determines that the operation of the system under test is normal.

In the example of FIG. 9, for example, the determining unit 507 ultimately determines that the operation of the system under test is normal because the function and performance of the system under test are normal. The output unit 508 outputs the determination result 901.

Various process procedures of the test management apparatus 202 according to the first embodiment will be described. First, a verification support process procedure of the test management apparatus 202 will be described.

FIG. 10 is a flowchart of an example of the verification support process procedure of the test management apparatus 202 according to the first embodiment. In the flowchart of FIG. 10, first, the test management apparatus 202 determines whether the capture data P has been acquired (step S1001).

The test management apparatus 202 waits for the acquisition of the capture data P (step S1001: NO). When the capture data P has been acquired (step S1001: YES), the test management apparatus 202 divides the capture data P to create the divided capture data $P_1$ to $P_n$ (step S1002).

The test management apparatus 202 sets "j" of the session Sj to "j=1" (step S1003). The test management apparatus 202 identifies among the divided capture data $P_1$ to $P_n$, one or more divided capture data that include at least a packet in a series of packets related to the session Sj (step S1004).

The test management apparatus 202 detects among the divided capture data related to the session Sj, the divided capture data $P_k$ that includes the packet X acting as an issuance request for cookie information identifying the user of the client apparatus CL (step S1005).

The test management apparatus 202 adds the packet X to the beginning of the subsequent divided capture data among the divided capture data related to the session Sj and transmitted after the divided capture data $P_k$ (step S1006).

The test management apparatus 202 increments "j" of the session Sj (step S1007) and determines whether "j" is larger than "m" (step S1008). If "j" is equal to or less than "m" (step S1008: NO), the test management apparatus 202 returns to step S1004.

On the other hand, if "j" is larger than "m" (step S1008: YES), the test management apparatus 202 outputs the divided capture data $P_1$ to $P_n$ for verification (step S1009) and terminates the series of the processes depicted in the flowchart. The divided capture data $P_1$ to $P_n$ for verification are the divided capture data $P_1$ to $P_n$ having the packet X added to the beginning of the divided capture date subsequent to the divided capture data $P_k$ for each session Sj.

The divided capture data $P_1$ to $P_n$ for verification can be output to perform the verification test with the load distributed in the verification systems 230-1 to 230-$n$.

A verification process procedure of the test management apparatus 202 will be described.

Figure 11:
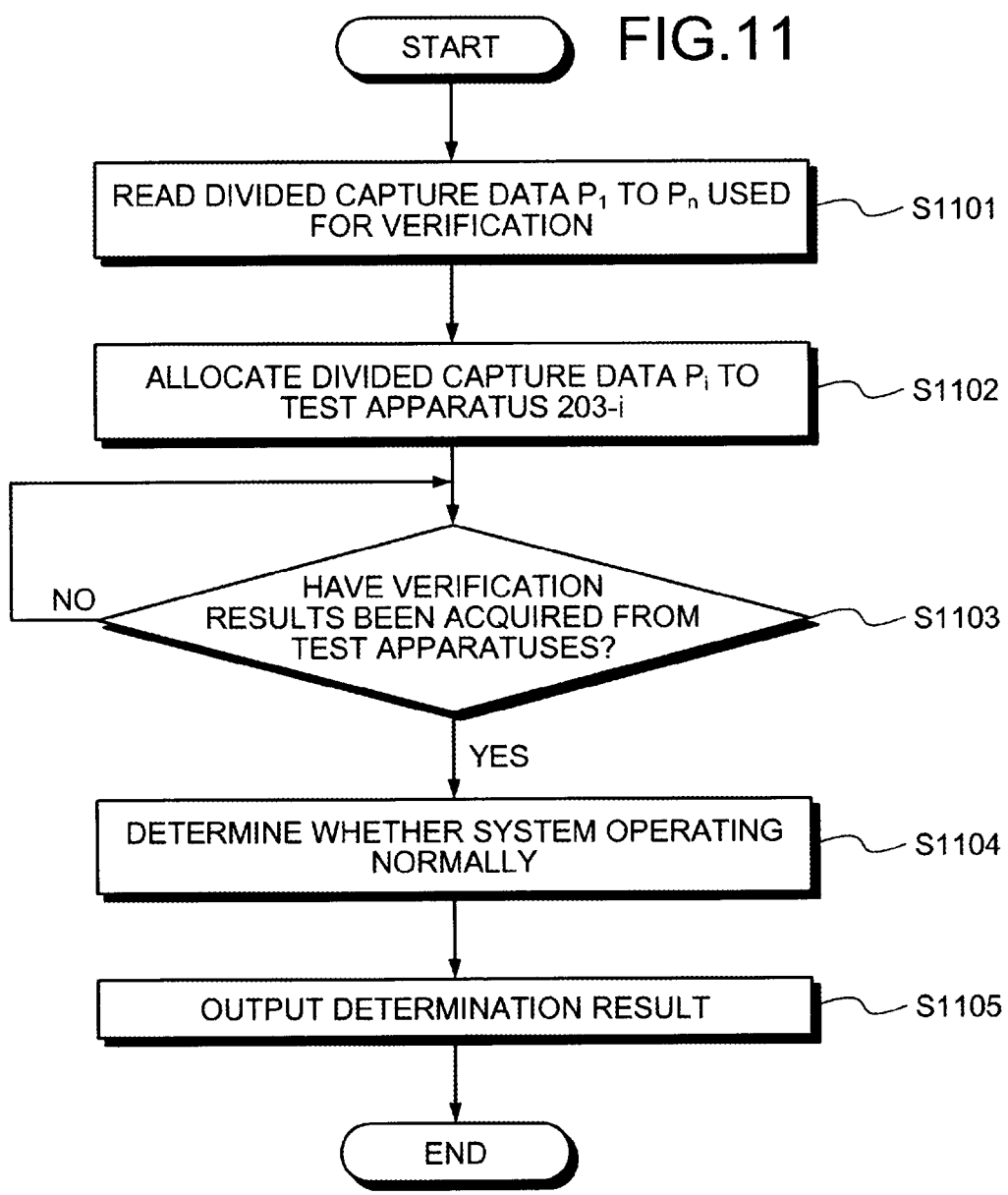
FIG. 11 is a flowchart of an example of the verification process procedure of the test management apparatus 202 according to the first embodiment.

FIG. 11 is a flowchart of an example of the verification process procedure of the test management apparatus 202 according to the first embodiment. In the flowchart of FIG. 11, first, the test management apparatus 202 reads from the memory 302, the divided capture data $P_1$ to $P_n$ used for verification (step S1101).

The test management apparatus 202 allocates the divided capture data $P_1$ to $P_n$ to the test apparatuses 203-1 to 203-$n$, respectively (step S1102). The test management apparatus 202 determines whether verification results have been acquired from the test apparatuses 203-1 to 203-$n$ (step S1103).

The test management apparatus 202 waits for the acquisition of the verification results from the test apparatuses 203-1 to 203-$n$ (step S1103: NO). When the verification results have been acquired from the test apparatuses 203-1 to 203-$n$ (step S1103: YES), the test management apparatus 202 determines based on the acquired verification results, whether the system under test operates normally (step S1104). The test management apparatus 202 outputs the determination result (step S1105) and terminates the series of the processes depicted in the flowchart.

As a result, the operation verification of the system under test can be performed with the load for the operation verification of the system under test, distributed substantially evenly to the test apparatuses 203-1 to 203-$n$.

As described, the test management apparatus 202 according to the first embodiment can detect among the divided capture data $P_1$ to $P_n$ divided from the capture data P, the divided capture data $P_k$ that includes the packet X. The packet X is a packet acting as an issuance request for the identification information of the transmission source and is a packet of a request for acquiring information (e.g., Cookie information) for maintaining a session between apparatuses. The test management apparatus 202 can add the packet X to the beginning of the divided capture data subsequent to the divided capture data $P_k$ to output the divided capture data $P_1$ to $P_n$ having the packet X added to the beginning of the subsequent divided capture data.

As a result, the divided capture data lacking a request for acquiring information for maintaining a session between apparatuses can be interpolated with the packet X to output the divided capture data $P_1$ to $P_n$ for verification.

The test management apparatus 202 can divide from the start time of the verification period, the capture data P by an interval equivalent to the base time T_div based on the capture times of the packets included in the capture data P. As a result, the divided capture data $P_1$ to $P_n$ can be created by dividing the capture data P such that the verification periods in the verification systems 230-$i$ become equal.

The test management apparatus 202 can divide from the start time of the verification period, the capture data P such that the data size of the divided capture data unit is set to the base size S_div based on the packet lengths of the packets included in the capture data P. As a result, the divided capture data $P_1$ to $P_n$ can be created by dividing the capture data P such that the data size of the divided capture data $P_i$ in the verification systems 230-$i$ become equal. As a result, the time required for reading the divided capture data $P_i$ in the verification systems 230-$i$ can be made constant to achieve a uniform start time of the verification periods. Although the end time of the verification periods in the verification systems 230-$i$ may vary, the end time can be made earlier by making the packet transmission interval shorter in a portion where communication between apparatuses is not often performed.

The test management apparatus 202 can allocate the divided capture data $P_1$ to $P_n$ used for verification to the test apparatuses 203-1 to 203-$n$, respectively. As a result, the load can be distributed to the verification systems 230-1 to 230-$n$ and the operation verification of the system under test can be performed in parallel.

The test management apparatus 202 can acquire verification results from the test apparatuses 203-$i$ as a result of performing the operation verification of the system under test based on the divided capture data $P_i$ in the verification systems 230-$i$. The test management apparatus 202 can perform the operation verification of the system under test based on the verification results acquired from the test apparatuses 203-1 to 203-$n$.

The test management apparatus 202 according to a second embodiment will be described. Components identical to those described in the first embodiment will not be described.

In the second embodiment, a case of transmitting and receiving a packet representative of operation to a DB between apparatuses of the working system 200 will be described. For example, in the second embodiment, the test management apparatus 202 generates replicated data of the storage contents in the DB at the time of division of the capture data P, thereby enabling the storage contents in the database at the time of division of the capture data P in the verification systems 230-$i$ to be restored and thus, enabling the function verification of the system under test based on the storage contents of the database.

An example of a packet indicative of an operation with respect to a DB and communicated between apparatuses of the working system 200 will be described. The DB to be operated is, for example, a DB included in a database server of the working system 200.

FIGS. 12 and 13 are explanatory views of examples of packets indicative of an operation with respect to the DB. In FIG. 12, a packet 1200 has an HTTP header portion 1201 and an HTTP body portion 1202. The packet 1200 includes a SELECT statement in the HTTP body portion 1202 and is a request for only referring to the contents of the DB, i.e., not rewriting the contents of the DB. For example, the packet 1200 is a request of a reference system for referring to a deposit of a customer name "Taro" in a user information management table.

In FIG. 13, a packet 1300 has an HTTP header portion 1301 and an HTTP body portion 1302. The packet 1300 includes an INSERT statement in the HTTP body portion 1302 and is a request for rewriting the contents of the DB. For example, the packet 1300 is a request of an update system for inserting lines of a customer name "Taro", a partner customer "Jiro", a transaction time "system time", transaction detail "Transfer", and a transaction amount "150$" into a procedure information management table.

An example of a functional configuration of the test management apparatus 202 according to the second embodiment will be described. FIG. 14 is a block diagram of an example of a functional configuration of the test management apparatus 202 according to the second embodiment. In FIG. 14, the test management apparatus 202 includes the acquiring unit 501, the creating unit 502, the detecting unit 503, the adding unit 504, the allocating unit 505, the collecting unit 506, the determining unit 507, the output unit 508, and a generating unit 1401. The acquiring unit 501 to the output unit 508 and the generating unit 1401 are functions acting as a control unit and, for example, are implemented by the CPU 301 executing programs stored in the memory 302, the HDD 303, etc. depicted in FIG. 3 or by the I/F 304. For example, the process results of the functional units are stored to the memory 302, the HDD 303, etc.

The generating unit 1401 has a function of generating replicated data for each time set within a predetermined period. The replicated data is a copy of the storage contents in the DB at each of the set times. The predetermined period is, for example, a period from the start time to the end time of the verification period for performing the operation verification of the system under test. The times are the times of division of the capture data P and include the start time and the end time of the verification period. The storage contents of the DB are, for example, storage contents of various tables stored in the DB.

For example, the generating unit 1401 generates snapshots $DB_0$ to $DB_n$ of various tables stored in the DB for times $T_0$ to $T_n$ when the capture data P is divided. The time $T_0$ corresponds to the start time of the verification period and the time $T_n$ corresponds to the end time of the verification period.

For example, the generated snapshots $DB_0$ to $DB_n$ of the DB for the times $T_0$ to $T_n$ are stored to shared memory access by the test apparatuses 203-$i$ and the verification apparatus groups 204-$i$ of the verification systems 230-$i$. The shared memory is implemented by the memory 302 and the HDD 303, for example. An example of the generation of the snapshots $DB_0$ to $DB_n$ will be described later with reference to FIG. 16.

The creating unit 502 divides the capture data P at the times $T_0$ to $T_n$ to create the divided capture data $P_1$ to $P_n$, thereby enabling the verification systems 230-$i$ to restore the storage contents of the DB for the start time and the end time of the verification periods from the snapshots $DB_0$ to $DB_n$.

The collecting unit 506 acquires a verification result from the test apparatus 203-$i$ as a result of performing the operation verification of the system under test based on a snapshot $DB_{i-1}$ and the divided capture data $P_i$ allocated to the test apparatus 203-$i$. The snapshot $DB_{i-1}$ is a snapshot of the DB corresponding to the start time of the verification period of the verification systems 230-$i$ in the snapshots $DB_0$ to $DB_n$.

The verification result from the test apparatus 203-$i$ includes, for example, a comparison result between the storage contents of the DB after completion of the verification of the verification system 230-$i$ and the storage result of the DB restored from the snapshot $DB_i$ corresponding to the end time of the verification period of the verification systems 230-$i$. An example of the verification result will be described later with reference to FIG. 18.

The determining unit 507 determines whether the system under test operates normally, based on the comparison result of storage contents of the DB included in the acquired verification result. For example, the determining unit 507 determines whether the system under test operates normally, based on the comparison results acquired from the test apparatuses 203-1 to 203-$n$. An example of the determination result will be described later with reference to FIG. 18.

Although the generating unit 1401 generates the snapshots $DB_0$ to $DB_n$ for the times $T_0$ to $T_n$ in the description, this is not a limitation.

For example, among first and second successive divided capture data in the divided capture data $P_1$ to $P_n$, the generating unit 1401 may retrieve from the first divided capture data, a packet indicative of an operation with respect to the DB. For example, the generating unit 1401 retrieves from the first divided capture data, a packet of a request of an update system. A request of an update system is, for example, the packet 1300, which includes the INSERT statement as depicted in FIG. 13.

In this case, the adding unit 504 may add the retrieved packet to the beginning of the second divided capture data. The adding unit 504 may add the packet X to the beginning of subsequent divided capture data among the divided capture data $P_1$ to $P_n$ and transmitted after the divided capture data $P_k$.

Consequently, the verification systems 230-$i$ to can reproduce the request of an update system included in divided capture data $P_{i-1}$. For example, assuming online shopping, contents of a shopping list updated in the divided capture data $P_{i-1}$ (such as an addition or cancellation of goods) can be reproduced in the divided capture data $P_1$.

The generating unit 1401 may generate the snapshot $DB_0$ of various tables stored in the DB at the time $T_0$. The time $T_0$ corresponds to the start time of the verification period. In this case, the creating unit 502 divides the capture data P by using the time $T_0$ as the reference time to create the divided capture data $P_1$ to $P_n$.

Consequently, based on the storage contents of the DB at the time $T_0$ restored from the snapshot $DB_0$, the verification systems 230-$i$ can return a proper value from a server in response to a request of an reference system from a client apparatus. An example of adding a packet of an update system will be described.

Figure 15:
FIG. 15 is an explanatory view of an example of adding a packet of an update system.

FIG. 15 is an explanatory view of an example of adding a packet of an update system. FIG. 15 depicts divided capture data $P_1$ and $P_2$ divided from given capture data P. However, packets p1, p5, p7, and p9 are not included in the divided capture data $P_2$ immediately after the division.

In this case, the generating unit 1401 retrieves from the divided capture data $P_1$, a packet indicative of an operation with respect to the DB. In the example of FIG. 15, the packets p5, p7, and p9 are retrieved. In this case, the adding unit 504 adds the retrieved packets p5, p7, and p9 to the beginning of the divided capture data $P_2$.

The adding unit 504 further adds the packet X detected from the divided capture data $P_1$ to the beginning of the divided capture data $P_2$. In the example of FIG. 15, the packet p1, i.e., the packet X, is added to the beginning of the divided capture data $P_2$ after the packets p5, p7, and p9 are added. In this case, the transmission times of the packets p5, p7, and p9 are changed to be after the transmission time of the packet p1 and earlier than the packet p10.

As a result, for example, when a user by the name of "Taro" transmits a request for checking a bank account at the time point of the packet p15, a proper value can be returned from the server. The packets P5, P7, and p9 added to the divided capture data $P_2$ can be transmitted at shorter time intervals provided the sequence is correct.

An example of generation of the snapshots $DB_0$ to $DB_n$ will be described. In this example, a reference time is set to "8:00:00" and the capture data P is divided from the reference time, by an interval equivalent to a time span of one hour.

Figure 16:
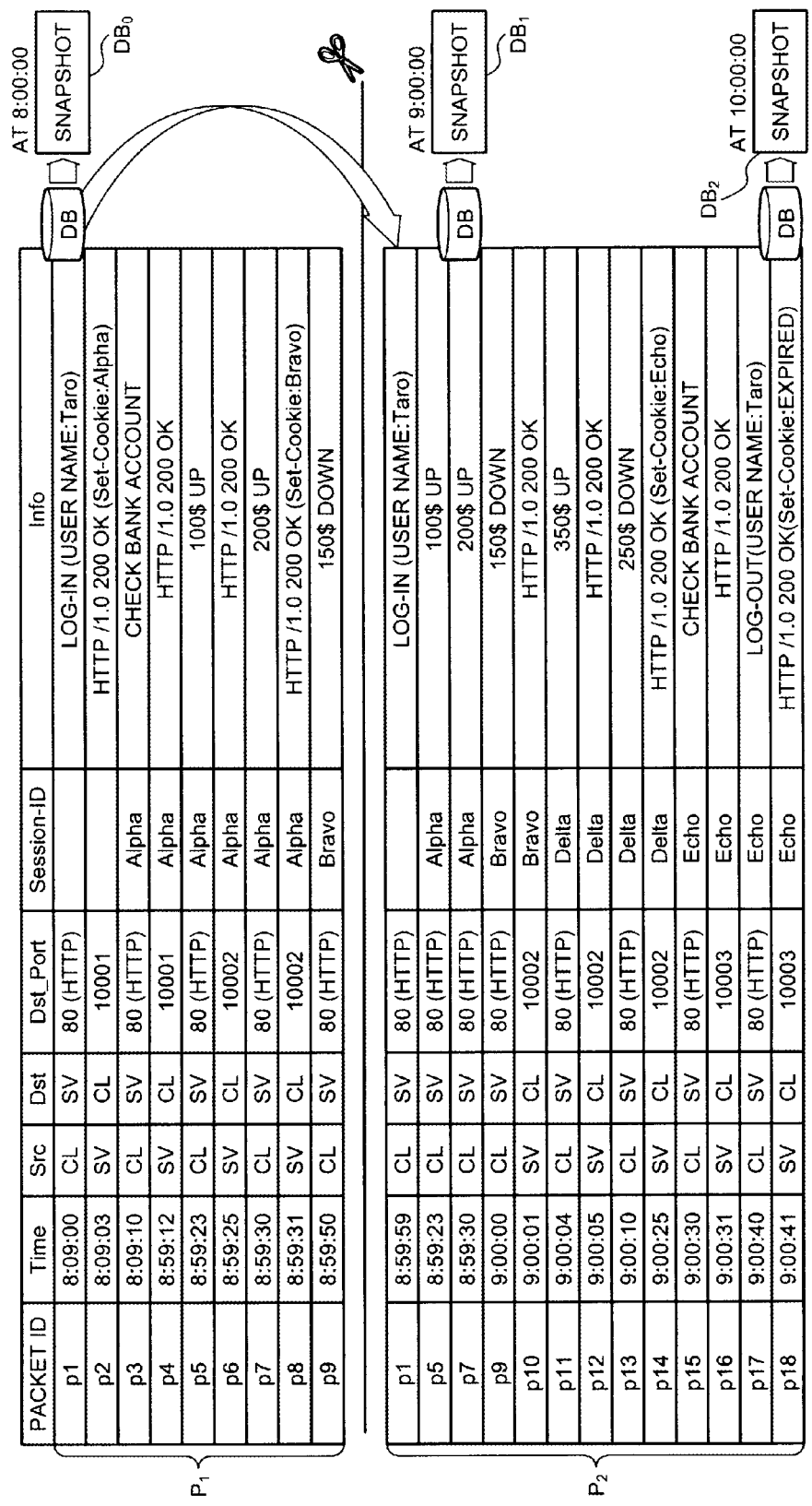
FIG. 16 is an explanatory view of an example of generation of snapshots.

FIG. 16 is an explanatory view of an example of generation of snapshots. FIG. 16 depicts the divided capture data $P_1$ and $P_2$ divided from capture data 1500. However, the packet p1 is not included in the divided capture data $P_2$ immediately after the division. In this example, the start time of the verification period of the system under test is "8:00:00" and the end time is "10:00:00".

Therefore, times $T_0$ to $T_2$ of division of the capture data P are "$T_0$=8:00:00", "$T_1$=9:00:00", and "$T_2$=10:00:00". In this case, the generating unit 1401 generates snapshots $DB_0$ to $DB_2$ of various tables in the DB at the times $T_0$ to $T_2$ of division of the capture data P.

Figure 17:
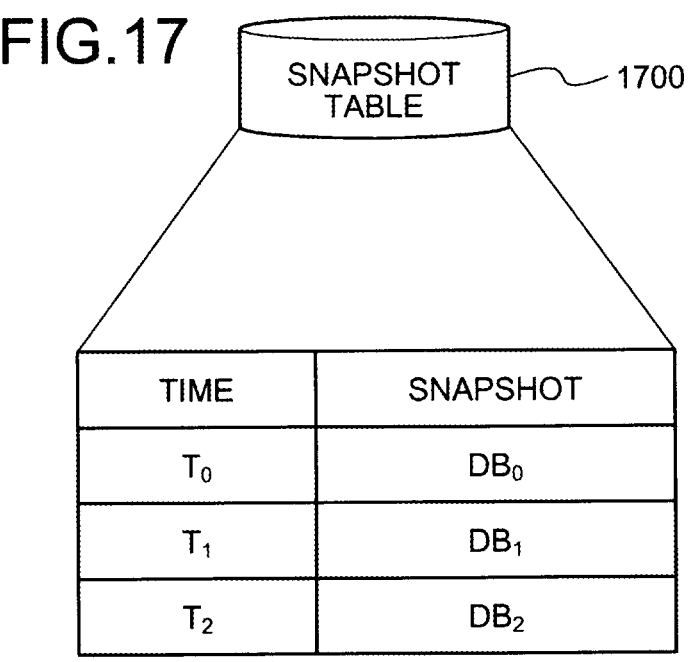
FIG. 17 is an explanatory view of an example of the storage contents of a snapshot table 1700.

For example, the generated snapshots $DB_0$ to $DB_2$ are stored to a snapshot table 1700 depicted in FIG. 17. The snapshot table 1700 is stored to a shared memory accessed by the test apparatuses 203-$i$ and the verification apparatus groups 204-$i$ of the verification systems 230-$i$.

FIG. 17 is an explanatory view of an example of the storage contents of the snapshot table 1700. In FIG. 17, the snapshot table 1700 correlates and stores the snapshots $DB_0$ to $DB_2$ with the times $T_0$ to $T_2$ of division of the capture data P. The test apparatuses 203-$i$ and the verification apparatus groups 204-$i$ of the verification systems 230-$i$ can access the snapshot table 1700 to acquire the snapshots $DB_0$ to $DB_2$ generated at the times $T_0$ to $T_2$.

Description will be made of a process example of the verification process of the test apparatus 203-1, based on the snapshots $DB_0$ and $DB_1$ and the divided capture data $P_i$ to which the packet X has been added.

Figure 18:
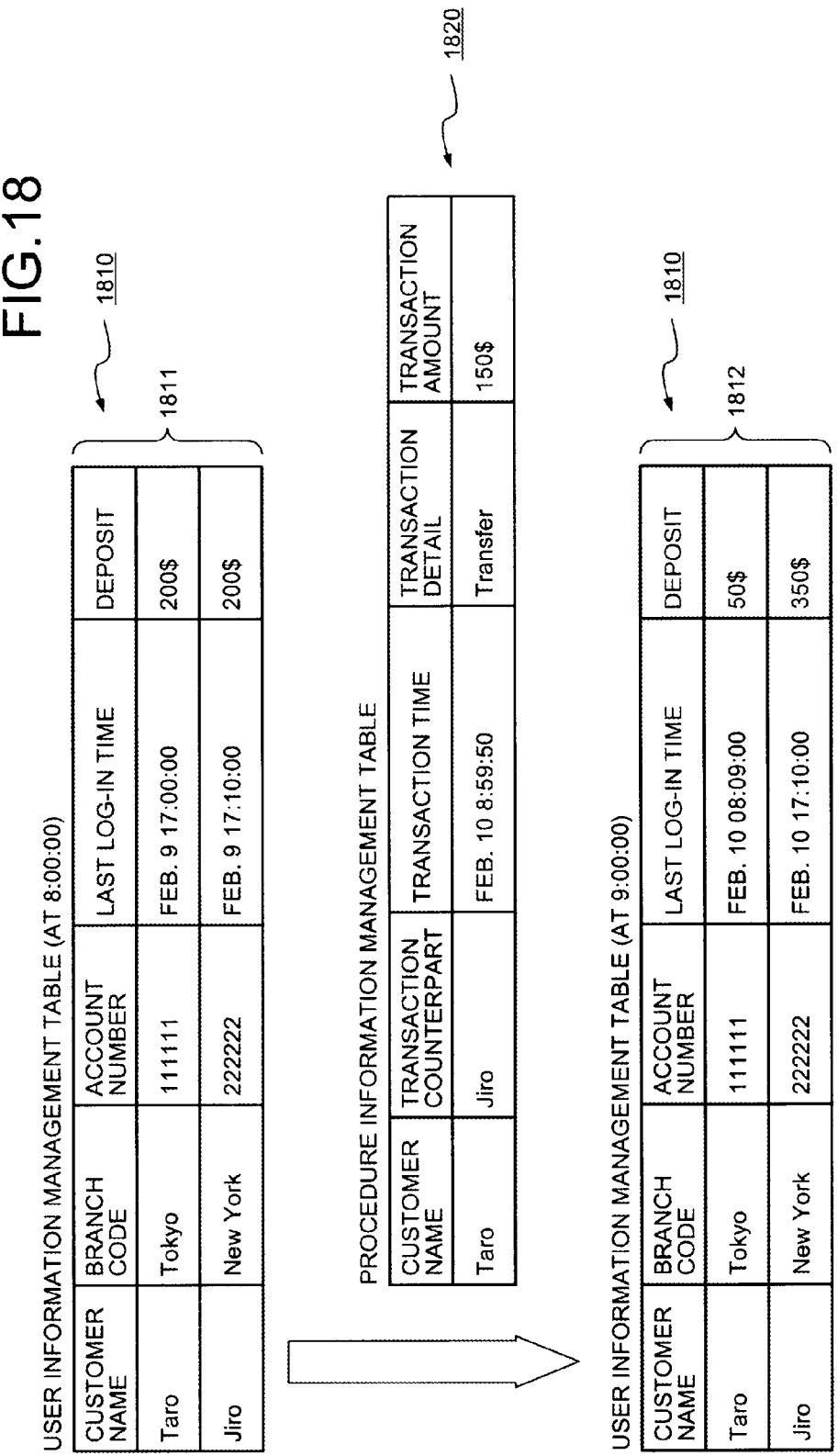
FIG. 18 is an explanatory view of a process example of a verification process of the test apparatus.

FIG. 18 is an explanatory view of a process example of the verification process of the test apparatus. In FIG. 18, storage contents 1811 of a user information management table 1810 are restored from the snapshot $DB_0$ at the time point "8:00:00". A snapshot at each time point is identified from the snapshot table 1700 depicted in FIG. 17, for example.

It is assumed that the divided capture data $P_i$ includes the packet 1300 depicted in FIG. 13. In this case, as a result of transmission and reception of the packet 1300 in the verification apparatus group 204-1 of the verification system 230-1, storage contents of a procedure information management table 1820 are updated. Based on the storage contents 1811 of the user information management table 1810 at the time point "8:00:00" and the storage contents of the updated procedure information management table 1820, storage contents 1812 of the user information management table 1810 are updated at the time point "9:00:00".

In this case, for example, the test apparatus 203-1 refers to the snapshot table 1700 and from the snapshot $DB_1$, restores the storage contents of the user information management table 1810 at the time point "9:00:00". The test apparatus 203-1 compares the storage contents 1812 of the user information management table 1810 and the restored storage contents of the user information management table 1810 at the time point "9:00:00". The test apparatus 203-1 transmits a verification result that includes a comparison result of the comparison to the test management apparatus 202.

Examples of a verification result and a determination result will be described with reference to FIG. 19. In the examples, the number of the divided capture data $P_1$ to $P_n$ is "4", i.e., the capture data P is divided into four parts.

Figure 19:
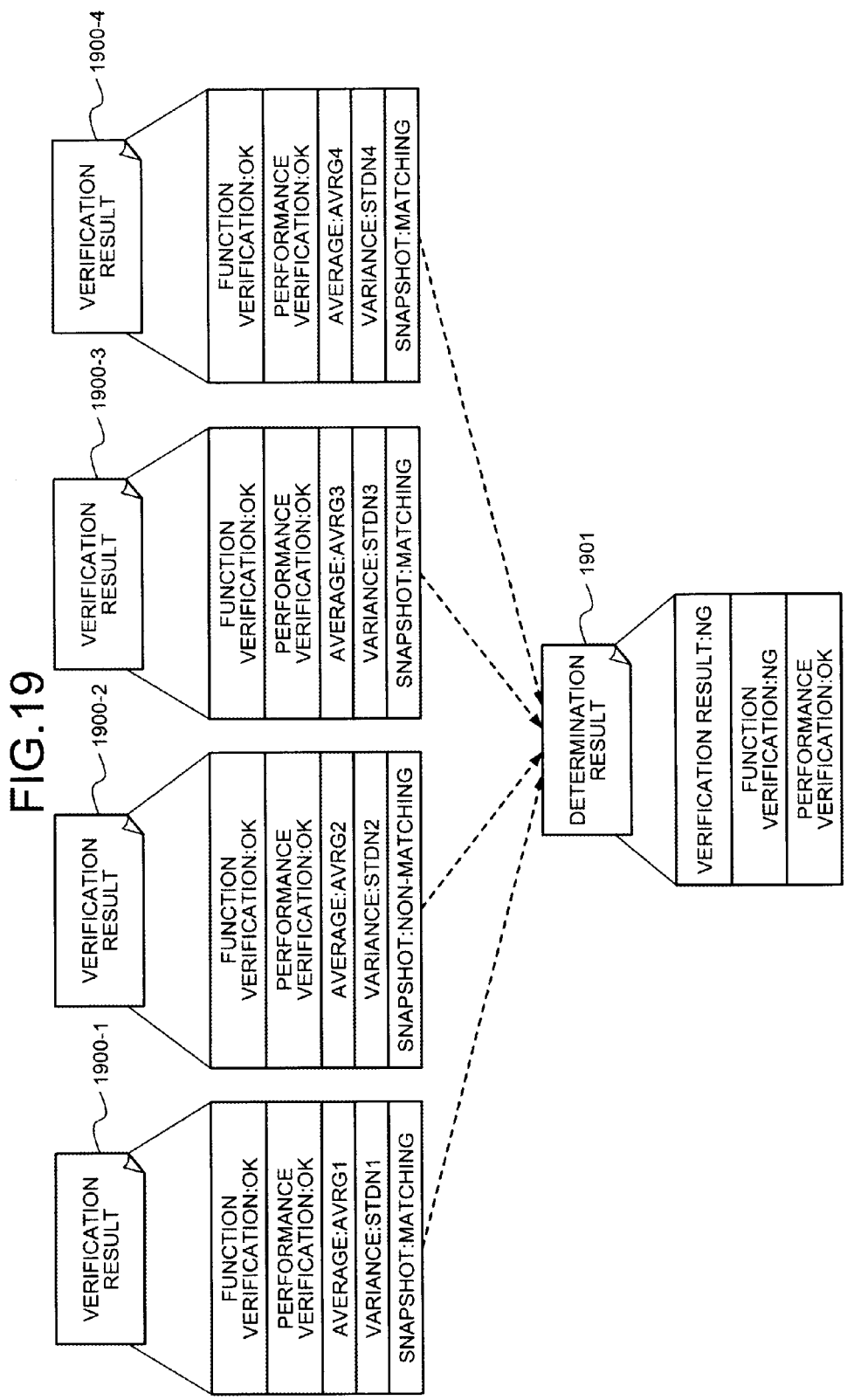
FIG. 19 is an explanatory view of examples of a verification result and a determination result.

FIG. 19 is an explanatory view of examples of a verification result and a determination result. In FIG. 19, verification results 1900-1 to 1900-4 represent verification results of the operation verification of the system under test, acquired from the test apparatuses 203-1 to 203-4.

The verification result 1900-1 indicates a verification result "OK" of the function verification of the system under test, a verification result "OK" of the performance verification of the system under test, an average "AVRG1" and variance "STDN1" of page load times of the system under test, and a snapshot "MATCHING". The snapshot "MATCHING" indicates that the storage contents of the DB after completion of the verification of the verification system 230-1 match the storage contents of the DB restored from the snapshot $DB_1$ corresponding to the end time of the verification period of the verification system 230-1.

The verification result 1900-2 indicates a verification result "OK" of the function verification of the system under test, a verification result "OK" of the performance verification of the system under test, an average "AVRG2" and variance "STDN2" of page load times of the system under test, and a snapshot "NON-MATCHING". The snapshot "NON-MATCHING" indicates that the storage contents of the DB after completion of the verification of the verification system 230-2 do not match the storage contents of the DB restored from the snapshot $DB_2$ corresponding to the end time of the verification period of the verification system 230-2.

The verification result 1900-3 indicates a verification result "OK" of the function verification of the system under test, a verification result "OK" of the performance verification of the system under test, an average "AVRG3" and variance "STDN3" of page load times of the system under test, and a snapshot "MATCHING". The snapshot "MATCHING" indicates that the storage contents of the DB after completion of the verification of the verification system 230-3 match the storage contents of the DB restored from the snapshot $DB_3$ corresponding to the end time of the verification period of the verification system 230-3.

The verification result 1900-4 indicates a verification result "OK" of the function verification of the system under test, a verification result "OK" of the performance verification of the system under test, an average "AVRG4" and variance "STDN4" of page load times of the system under test, and a snapshot "MATCHING". The snapshot "MATCHING" indicates that the storage contents of the DB after completion of the verification of the verification system 230-4 match the storage contents of the DB restored from the snapshot $DB_4$ corresponding to the end time of the verification period of the verification system 230-4.

The determining unit 507 determines whether the function of the system under test is normal, based on the verification results 1900-1 to 1900-4. In this example, for example, although the verification results of the function verification are "OK" in the verification results 1900-1 to 1900-4, the snapshot of the verification result 1900-2 is "NON-MATCHING" and therefore, the determining unit 507 determines that the function of the system under test is abnormal.

For example, since all the verification results of the performance verification are "OK" in the verification results 1900-1 to 1900-4, the determining unit 507 determines that the performance of the system under test is normal. In this case, the determining unit 507 further determines that the operation of the system under test is abnormal since the function of the system under test is abnormal. The output unit 508 outputs a determination result 1901.

A generation process procedure of the test management apparatus 202 according to the second embodiment 2 will be described. The generation process is a process of generating the snapshots $DB_0$ to $DB_n$ of various tables stored in the DB at times $T_0$ to $T_n$ of division of the capture data P.

FIG. 20 is an explanatory view of an example of the generation process procedure of the test management apparatus 202 according to the second embodiment. In the flowchart of FIG. 20, the test management apparatus 202 sets "i" of time $T_i$ to "i=0" (step S2001) and determines whether the current time is the time $T_i$ (step S2002).

The test management apparatus 202 waits until the current time becomes the time $T_i$ (step S2002: NO). When the current time becomes the time $T_i$ (step S2002: YES), the test management apparatus 202 generates a snapshot $DB_i$ of the storage contents of the DB (step S2003).

The test management apparatus 202 increments "i" of the time $T_i$ (step S2004) and determines whether "i" is larger than "n" (step S2005). If "i" is equal to or less than "n" (step S2005: NO), the test management apparatus 202 returns to step S2002.

On the other hand, if "i" is larger than "n" (step S2005: YES), the test management apparatus 202 terminates the series of processes depicted in the flowchart. Thus, generation of the snapshots $DB_0$ to $DB_n$ of various tables stored in the DB at times $T_0$ to $T_n$ of division of the capture data P is possible.

The verification support process procedure and the verification process procedure of the test management apparatus 202 according to the second embodiment are the same as the verification support process procedure and the verification process procedure of the test management apparatus 202 described in the first embodiment and therefore, will not be described.

If a packet of an update system is added to the divided capture data $P_i$, the test management apparatus 202 for each session $S_j$, retrieves from the divided capture data $P_{i-1}$ and adds to the divided capture data $P_i$, a packet of an update system.

The verification process procedure of the test apparatus 203-*i* according to the second embodiment will be described. In this description, a period of performing the verification test in the verification system 230-*i* is referred to as a "base time". The base time is a constant time span (e.g., one hour) at which the capture data P is divided, for example.

FIG. 21 is a flowchart of an example of the verification process procedure of the test apparatus 203-*i* according to the second embodiment. In the flowchart of FIG. 21, first, the test apparatus 203-*i* restores from a snapshot $DB_{i-1}$, the storage contents of the DB (step S2101).

The test apparatus 203-$i$ performs the operation verification of the system under test, based on the allocated divided capture data P$_i$ and the restored storage contents of the DB (step S2102). The test apparatus 203-$i$ determines whether the operation verification of the system under test has been completed within the base time (step S2103).

If the operation verification of the system under test has been completed within the base time (step S2103: YES), the test apparatus 203-$i$ acquires the storage contents of the DB after completion of the verification of the verification system 230-$i$ (step S2104). The test apparatus 203-$i$ then restores the storage contents of the DB from the snapshots DB$_i$ (step S2105).

The test apparatus 203-$i$ determines whether the acquired storage contents of the DB match the restored storage contents of the DB (step S2106). If the storage contents of the DB match (step S2106: YES), the test apparatus 203-$i$ transmits to the test management apparatus 202, a verification result that includes a comparison result indicative of the consistency of the snapshot (step S2107) and terminates the series of processes depicted in the flowchart.

On the other hand, if the storage contents of the DB do not match (step S2106: NO), the test apparatus 203-$i$ transmits to the test management apparatus 202, a verification result that includes a comparison result indicative of the inconsistency of the snapshot (step S2108) and terminates the series of processes depicted in the flowchart.

If the operation verification of the system under test has not been completed within the base time at step S2103 (step S2103: NO), the test apparatus 203-$i$ transmits to the test management apparatus 202, a verification result indicative of a verification failure (step S2109) and terminates the series of processes depicted in the flowchart.

Thus, the verification system 230-$i$ can restore the storage contents of the DB at times T$_{i-1}$ and T$_i$ of division of the capture data P to perform the function verification of the system under test based on the storage contents of the DB. More accurate function verification can be achieved by also performing a comparison of the number of responses or the response codes as described in the first embodiment.

When a configuration or a function of a DB to be operated is changed to perform a verification test, the effectiveness of a configuration change or a function change of the DB or the cause of failure of the verification test can be more easily determined by referring to log information and statistical information accumulated in an application and the DB. For example, when the number of DBs is increased or a cache function of a DB is utilized to perform a verification test, this enables detection of an event in which the DB cannot cope with the load and stops returning a response as a result of execution of a process applying a considerable load on the DB.

As described, the test management apparatus 202 according to the second embodiment can generate the snapshots DB$_0$ to DB$_n$ of various tables in the DB at the times T$_0$ to T$_n$ of division of the capture data P.

The test apparatuses 203-$i$ according to the second embodiment can restore the storage contents of the DB at the times T$_{i-1}$ and T$_i$ of division of the capture data P to perform the function verification of the system under test based on the storage contents of the DB.

The test management apparatus 202 can retrieve from the first divided capture data among the first and second successive divided capture data in the divided capture data P$_1$ to P$_n$, a packet of an update system indicative of an operation with respect to the DB. The test management apparatus 202 can add the retrieved packet of the update system to the beginning of the second divided capture data.

Thus, the verification systems 230-$i$ can reproduce the request of the update system included in the divided capture data P$_{i-1}$. As a result, the verification systems 230-$i$ can return a proper value from a server in response to a request of a reference system from a client apparatus.

The verification support method described in the present embodiment may be implemented by executing a prepared program on a computer such as a personal computer and a workstation. The program is stored on a computer-readable recording medium such as a hard disk, a flexible disk, a CD-ROM, a magnet-optical (MO) disk, and a DVD, read out from the computer-readable medium, and executed by the computer. The program may be distributed through a network such as the Internet.

One aspect of the present invention enables creation of verification data for distributed processing (in multiple verification systems) of a verification test of a system.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a verification support process comprising:

generating for each time set within a predetermined period, replicated data that is a copy of storage contents of a database at each of the times, the generating being performed when data indicative of an operation with respect to the database is transmitted and received between apparatuses;

storing the replicated data into a storage unit accessible to a plurality of verification apparatuses performing operation verification of a system under test;

acquiring a series of data transmitted and received between the apparatuses within the predetermined period;

creating a plurality of data groups by dividing the series of acquired data at each of the times;

detecting among the created data groups, a data group that includes (a) first given data acting as an issuance request for a session ID identifying a session executed between the apparatuses and (b) second given data indicative of the operation with respect to the database;

adding the first given data and the second given data to the beginning of subsequent data groups that are among the created data groups and transmitted after the detected data group;

allocating respectively to the verification apparatuses, the subsequent data groups to which the first given data and the second given data have been added;

acquiring from the verification apparatuses, respectively and consequent to the operation verification based on the data groups and on the replicated data stored in the storage unit and corresponding to a start time of the operation verification, a result of comparison of the storage contents of the database at an end time of the operation verification and the replicated data stored in the storage unit and corresponding to the end time of the operation verification;

determining based on the result acquired from each of the verification apparatuses, whether the system under test operates normally; and outputting a determination result obtained at the determining.

2. The non-transitory computer-readable recording medium according to claim 1, wherein the creating includes dividing the series of data, from a reference time and based on a data amount of each data in the series of data, such that a data volume of each data group is a predetermined value.

3. The non-transitory computer-readable recording medium according to claim 1, wherein the creating includes dividing, from a reference time, the series of data by a time span based on a data transmission time of each data of the series of data.

4. A verification support method executed by a computer, the verification support method comprising:

generating for each time set within a predetermined period, replicated data that is a copy of storage contents of a database at each of the times, the generating being performed when data indicative of an operation with respect to the database is transmitted and received between apparatuses;

storing the replicated data into a storage unit accessible to a plurality of verification apparatuses performing operation verification of a system under test;

acquiring a series of data transmitted and received between the apparatuses within the predetermined period;

creating a plurality of data groups by dividing the series of acquired data at each of the times;

detecting among the created data groups, a data group that includes (a) first given data acting as an issuance request for a session ID identifying a session executed between the apparatuses and (b) second given data indicative of the operation with respect to the database;

adding the first given data and the second given data to the beginning of subsequent data groups that are among the created data groups and transmitted after the detected data group;

allocating respectively to the verification apparatuses, the subsequent data groups to which the first given data and the second given data have been added;

acquiring from the verification apparatuses, respectively and consequent to the operation verification based on the data groups and on the replicated data stored in the storage unit and corresponding to a start time of the operation verification, a result of comparison of the storage contents of the database at an end time of the operation verification and the replicated data stored in the storage unit and corresponding to the end time of the operation verification;

determining based on the result acquired from each of the verification apparatuses, whether the system under test operates normally; and outputting a determination result obtained at the determining.

5. A verification support apparatus comprising: a processor programmed to:

generate for each time set within a predetermined period, replicated data that is a copy of storage contents of a database at each of the times, the generating being performed when data indicative of an operation with respect to the database is transmitted and received between apparatuses;

store the replicated data into a storage unit accessible to a plurality of verification apparatuses performing operation verification of a system under test;

acquire a series of data transmitted and received between the apparatuses within the predetermined period;

create a plurality of data groups by dividing the series of acquired data at each of the times;

detect among the created data groups, a data group that includes (a) first given data acting as an issuance request for a session ID identifying a session executed between the apparatuses and (b) second given data indicative of the operation with respect to the database;

add the first given data and the second given data to the beginning of subsequent data groups that are among the created data groups and transmitted after the detected data group;

respectively allocate to the verification apparatuses, the subsequent data groups to which the first given data and the second given data have been added;

acquire from the verification apparatuses, respectively and consequent to the operation verification based on the data groups and on the replicated data stored in the storage unit and corresponding to a start time of the operation verification, a result of comparison of the storage contents of the database at an end time of the operation verification and the replicated data stored in the storage unit and corresponding to the end time of the operation verification;

determine based on the result acquired from each of the verification apparatuses, whether the system under test operates normally; and output a determination result obtained at the determining.

* * * * *